United States Patent
Jung et al.

(10) Patent No.: US 10,241,597 B2
(45) Date of Patent: Mar. 26, 2019

(54) ACTIVE STYLUS PEN AND TOUCH SENSING SYSTEM INCLUDING THE SAME

(71) Applicant: LG DISPLAY CO., LTD., Seoul (KR)

(72) Inventors: Doyoung Jung, Seoul (KR); Cheolse Kim, Daegu (KR); Buyeol Lee, Goyang-si (KR); Hyunguk Jang, Paju-si (KR); Sanghyuck Bae, Paju-si (KR)

(73) Assignee: LG Display Co., Ltd., Seoul (KR)

(*) Notice: Subject to any disclaimer, the term of this patent is extended or adjusted under 35 U.S.C. 154(b) by 17 days.

(21) Appl. No.: 15/392,783

(22) Filed: Dec. 28, 2016

(65) Prior Publication Data
US 2017/0285771 A1    Oct. 5, 2017

(30) Foreign Application Priority Data
Mar. 31, 2016    (KR) .................. 10-2016-0039022

(51) Int. Cl.
| | |
|---|---|
| G06F 3/01 | (2006.01) |
| G06F 3/03 | (2006.01) |
| G06F 3/041 | (2006.01) |
| G06F 3/044 | (2006.01) |
| G06F 3/046 | (2006.01) |
| G06F 3/043 | (2006.01) |
| G06F 3/048 | (2013.01) |
| H01Q 1/24 | (2006.01) |
| G06F 3/038 | (2013.01) |
| G06F 3/0354 | (2013.01) |

(52) U.S. Cl.
CPC ............ *G06F 3/0383* (2013.01); *G06F 3/038* (2013.01); *G06F 3/03545* (2013.01); *G06F 3/044* (2013.01); *G06F 3/0412* (2013.01); *G06F 3/0416* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,308,936 A | * | 5/1994 | Biggs ................... | G06F 3/043 178/18.04 |
| 5,438,275 A | * | 8/1995 | Fado .................. | G06F 3/03545 324/662 |
| 8,199,132 B1 | * | 6/2012 | Oda .................... | G06F 3/03545 178/19.03 |

(Continued)

*Primary Examiner* — Lin Li
(74) *Attorney, Agent, or Firm* — Seed Intellectual Property Law Group LLP

(57) ABSTRACT

An active stylus pen is insensitive to external noise and has enhanced sensing performance with respect to an uplink signal input from a touch screen. The active stylus pen includes a housing connected to a ground, a conductive tip protruding outwardly from one side of the housing and brought into contact with a touch screen, a conductor layer surrounding an outer surface of the housing with an insulator interposed therebetween, a pen driving circuit connected to the conductor layer, and a switch connecting the conductor layer and the pen driving circuit. The pen driving circuit is cased by the housing, receives an uplink signal and a touch sensor driving signal from the touch screen, generates a pen driving signal synchronized with the touch sensor driving signal and outputs the generated pen driving signal to the touch screen through the conductive tip.

20 Claims, 24 Drawing Sheets

(56) References Cited

U.S. PATENT DOCUMENTS

| | | | |
|---|---|---|---|
| 2002/0134594 A1* | 9/2002 | Taylor | G06F 3/0346 178/18.01 |
| 2011/0193776 A1* | 8/2011 | Oda | G06F 3/046 345/157 |
| 2012/0050207 A1* | 3/2012 | Westhues | G06F 3/03545 345/174 |
| 2012/0256830 A1* | 10/2012 | Oda | G06F 3/03545 345/157 |
| 2014/0002422 A1* | 1/2014 | Stern | G06F 3/03545 345/179 |
| 2014/0028634 A1* | 1/2014 | Krah | G06F 3/041 345/179 |
| 2014/0104224 A1* | 4/2014 | Ih | G06F 3/044 345/174 |
| 2015/0091843 A1 | 4/2015 | Ludden | |
| 2015/0193025 A1* | 7/2015 | Rebeschi | G06F 3/03545 345/174 |
| 2016/0062519 A1 | 3/2016 | Park et al. | |
| 2016/0070372 A1 | 3/2016 | Hamaguchi | |
| 2016/0188015 A1* | 6/2016 | Song | G06F 3/016 345/179 |
| 2017/0068345 A1* | 3/2017 | Barel | G06F 3/03545 |
| 2017/0131817 A1* | 5/2017 | Wong | G06F 3/03545 |
| 2017/0153763 A1* | 6/2017 | Vavra | G06F 3/0488 |

* cited by examiner

| PALM CONTACT AREA | | VOLTAGE OF UPLINK SIGNAL [mV] | |
|---|---|---|---|
| [mm] | [mm²] | TOUCH SCREEN | SYSTEM GND |
| No Palm | 0 | 84 | 0 |
| 20X25 | 500 | 64 | 7.2 |
| 40X25 | 1000 | 57 | 11.3 |
| 60X25 | 1500 | 49 | 15.9 |
| 40X50 | 2000 | 46 | 20.1 |
| 50X50 | 2500 | 42 | 21.3 |
| 40X75 | 3000 | 40 | 23.4 |
| 80X75 | 6000 | 35 | 26 |
| 120X75 | 9000 | 31 | 29.4 |
| 160X75 | 12000 | 27 | 32.9 |

FIG. 8A (RELATED ART)

ACTIVE STYLUS PEN AND TOUCH SENSING SYSTEM INCLUDING THE SAME

CROSS-REFERENCE TO RELATED APPLICATION(S)

This application claims the benefit of Korea Patent Application No. 10-2016-0039022, filed Mar. 31, 2016, which is incorporated herein by reference for all purposes as if fully set forth herein.

BACKGROUND

Technical Field

The present disclosure relates to a touch sensing system and, more particularly, to a touch sensing system allowing for a touch input through an active stylus pen.

Description of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been adopted for use in a variety of portable information appliances. The touch UI is implemented by forming a touch screen on the screen of a display device. The touch screen may be implemented as a capacitive touch screen. The touch screen having capacitive touch sensors senses changes (i.e., changes in charges of the touch sensor) in a capacitance resulting from an input of a touch driving signal when a user touches (or approaches) the touch sensor with his or her finger or a conductive material, and thus detects a touch input.

A capacitive touch sensor may be implemented as a self-capacitance sensor or a mutual capacitance sensor. Electrodes of the self-capacitance sensor may be connected to sensor lines formed in one direction, respectively. The mutual capacitance sensor may be formed in intersections of sensor lines perpendicular to each other with a dielectric layer interposed therebetween.

Recently, stylus pens have been commonly used as human interface devices (HIDs), as well as fingers, in smartphones, smart books, and the like. Stylus pens advantageously allow more specific inputs than fingers. Stylus pens include a passive stylus pen and an active stylus pen. The passive stylus pen is difficult to detect a touch position due to a small change in capacitance in a contact point on a touch screen. Compared with the passive stylus pen, the active stylus pen is easy to detect a touch position because the active stylus pen generates a driving signal and outputs the generated driving signal to a contact point on the touch screen.

A touch sensing system including such an active stylus pen operates as follows.

A touch screen driving signal is applied to a touch screen. The touch screen driving signal includes an uplink signal for synchronization with an active stylus pen and a touch sensor driving signal for sensing a touch input applied to the touch screen. When the active stylus pen is brought into contact with the touch screen, the active stylus pen receives an uplink signal from the touch screen, generates a downlink signal (hereinafter, referred to as a "pen driving signal") in synchronization with the touch sensor driving signal on the basis of the uplink signal, and outputs the generated pen driving signal to the touch screen through a conductive tip. Since the pen driving signal is synchronized with the touch sensor driving signal, it serves to increase sensitivity of the touch sensor driving signal. The touch sensing system senses a touch input by sensing a change in capacitance in a touch point based on the touch sensor driving signal and the pen driving signal.

However, in a case in which a palm touches the touch screen together with the active stylus pen, a problem arises in that the active stylus pen fails to receive an uplink signal. Here, the palm may be either a palm of a hand gripping the stylus pen or a hand without the stylus pen. In this case, the active stylus pen may fail to be synchronized with the touch screen so it is impossible to perform a normal operation.

A first reason why the active stylus pen cannot receive an uplink signal is because, when the palm touches the touch screen, a load of the touch screen is increased to attenuate a magnitude of the uplink signal. A second reason why the active stylus pen cannot receive the uplink signal is because, when the palm touches the touch screen, an uplink signal is transferred to a housing serving as a ground of the active stylus pen, and thus, the active stylus pen is not able to recognize the uplink signal received through the conductive tip due to interference of the uplink signal received through the housing.

The first reason will be described in detail with reference to FIGS. 2A to 3. A touch driving device generates an uplink signal using input power Vin and applies the generated uplink signal to the touch screen. When a quantity of electric charges transferred to the touch screen as illustrated in FIG. 2A is Qin and a load of the touch screen is Cpl, a magnitude Vp of the uplink signal detected from the touch screen is Qin/Cpl. Here, when a palm touches the touch screen, a load Chl of the human body is added to the load Cpl of the touch screen as illustrated in FIG. 2B. Since the quantity Qin of the electric changes supplied from the touch driving device is equal, the magnitude Vp of the uplink signal is reduced by a magnitude of the load Chl of the human body added to the load Cpl of the touch screen. That is, the magnitude Vp of the uplink signal detected from the touch screen is Qin/Cpl+Chl. Since capacitance of a capacitor is proportional to an area, as a contact area between the touch screen and the palm is increased, the load Chl of the human body is increased and the magnitude Vp of the uplink signal detected from the touch screen is decreased.

The second reason will be described in more detail with reference to FIGS. 4 to 9. When the palm touches the touch screen, an uplink signal is transferred to the housing of the active stylus pen through the human body. The palm may be either the hand gripping the pen or the other hand, and a magnitude of the uplink signal transferred to the human body is proportional to a contact area between the touch screen and the palm. (A) of FIG. 5 illustrates the uplink signal applied to the touch screen, and (B) of FIG. 5 illustrates the uplink signal detected from the human body. As illustrated in FIG. 5, as the contact area of the palm is increased, the uplink signal detected from the human body is increased, and the uplink signal is transferred to the housing of the active stylus pen. The active stylus pen receives the uplink signal from the touch screen through pen capacitor Cp formed between the conductive tip and the touch screen as illustrated in FIG. 4, and here, when the palm touches the touch screen, the uplink signal is further received through human capacitor Ch formed between the housing of the pen and the touch screen. Here, the pen driving circuit receives the uplink signal simultaneously from both the conductive tip connected to a positive (+) terminal and the housing (ground) connected to a negative (−) terminal as illustrated in FIG. 9, and thus, it is impossible to normally recognize the uplink signal.

Meanwhile, when the touch screen is in a floating state in which the touch screen is not connected to an earth ground of the touch sensing system (that is, when the touch screen is driven by a portable battery), when the palm touches the touch screen, the uplink signal detected from the touch screen is reduced as illustrated in (A) of FIG. 7 and a ground waveform (i.e., an uplink signal detected from an external case of the touch sensing system) is increased in an out-of-phase manner with respect to the uplink signal (A). In a case in which the palm touches even the external case of the touch sensing system, an out-of-phase uplink signal is transferred to the housing of the pen through the human body. The out-of-phase uplink signal transferred to the housing of the pen lowers a recognition rate of the uplink signal received through the conductive tip.

A mechanism in which an out-of-phase uplink signal is generated from the external case of the touch sensing system when the palm touches the touch screen will be described. First, as illustrated in FIG. 6A, the touch driving device drives an uplink signal to apply input electric charges Qin to the touch screen. Then, positive electric charges +Qin are accumulated in one electrode (left electrode) of a panel capacitor Cpanel formed in the touch screen, and negative electric charges −Qin are accumulated in the other electrode of the panel capacitor Cpanel. Thereafter, as illustrated in FIG. 6B, when the palm touches the touch screen, a human capacitor Chuman is further connected to the touch screen. Accordingly, first negative electric charges −Qpanel corresponding to negative electric charges −Qin remain in one electrode (left electrode) of the panel capacitor Cpanel, and second negative electric charges −Qhuman corresponding to the remainder of the negative electric charges −Qin are stored in the human capacitor Chuman. Here, since the capacitor has qualities of storing the same amount of electric charges at both ends thereof, only first positive electric charges +Qpanel remain in one electrode of the panel capacitor Cpanel and the other remaining positive electric charges +(Qin-Qpanel) are pushed out toward a ground GND of the touch sensing system. As a result, an out-of-phase uplink signal is applied to the ground GND connected to the external case of the touch sensing system.

As can be seen from the simulation results of FIGS. 8A and 8B, as a contact area between the touch screen and the palm is increased, a magnitude of the uplink signal detected from the touch screen is decreased, while a magnitude of the out-of-phase uplink signal detected from the ground of the touch sensing system is increased.

FIG. 9 is a view illustrating a structure of an active stylus pen in terms of a pen driving circuit when the palm touches the touch screen. Referring to FIG. 9, a receiving unit of the pen driving circuit may include an amplifier having a positive (+) input terminal connected to the conductive tip and a negative (−) input terminal connected to a ground GND. When the palm touches the touch screen, the negative (−) input terminal is connected to the touch screen through a human capacitor Ch, the active stylus pen has no choice but to be significantly affected by external noise input from the touch screen.

BRIEF SUMMARY

An aspect of the present disclosure provides an active stylus pen being insensitive to external noise and having enhanced sensing performance with respect to an uplink signal input from a touch screen, regardless of whether a palm touches the touch screen, and a touch sensing system including the same.

According to an aspect of the present disclosure, an active stylus pen includes: a housing connected to an electrical ground; a conductive tip protruding outwardly from one side (e.g., from an end) of the housing and operably brought into contact with a touch screen; a conductor layer surrounding an outer surface of the housing with an insulator interposed therebetween; a pen driving circuit connected to the conductor layer; and a switch that selectively couples the conductor layer and the pen driving circuit. The pen driving circuit may be cased (or housed) by the housing, receive an uplink signal and a touch sensor driving signal from the touch screen, generate a pen driving signal synchronized with the touch sensor driving signal and output the generated pen driving signal to the touch screen through the conductive tip.

At least one touch period of one frame may be allocated to drive the touch screen, and the switch may be switched on during a reception section for inputting the uplink signal within the touch period to connect the conductor layer and the pen driving circuit, and switched off during a transmission section for outputting the pen driving signal within the touch period to release (i.e., to decouple) the electrical connection between the conductor layer and the pen driving circuit.

The conductive tip may be coupled to the touch screen through a pen capacitor or capacitance, and the conductor layer may be coupled to the touch screen through a human capacitor or capacitance.

During the reception section, the pen driving circuit may receive the uplink signal through at least one of the conductive tip and the conductor layer.

When at least one touch period of one frame is allocated to drive the touch screen and the uplink signal is continuously applied in in-phase to the touch screen during the touch period, the switch may be switched on during a reception section for inputting the uplink signal within the touch period, and when the uplink signal is input in out-of-phase to the pen driving circuit within the reception section, the switch may be switched off.

When at least one touch period of one frame is allocated to drive the touch screen and the uplink signal is alternately applied in in-phase and out-of-phase to the touch screen during the touch period, the switch may be maintained in an ON state during a reception section for inputting the uplink signal within the touch period.

According to another aspect of the present disclosure, a touch sensing system includes: a touch screen; a touch driving device applying an uplink signal and a touch sensor driving signal to the touch screen; and an active stylus pen generating a pen driving signal synchronized with the touch sensor driving signal and outputting the generated pen driving signal to the touch screen. Here, the active stylus pen may include: a housing connected to an electrical ground; a conductive tip protruding outwardly from one side of the housing and brought into contact with the touch screen; a conductor layer surrounding an outer surface of the housing with an insulator interposed therebetween; a pen driving circuit receiving the uplink signal and the touch sensor driving signal from the touch screen, outputting the pen driving signal to the touch screen through the conductive tip, and cased by the housing; and a switch connecting the conductor layer and the pen driving circuit.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIGS. 4, 5, 6A, 6B, 7, 8A and 8B are views illustrating another example in which a related art active stylus pen fails to receive an uplink signal.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In this disclosure, a detailed description of certain features or functionalities that are known in the relevant art may be omitted if inclusion of such description can mislead, obscure or is otherwise not helpful in understanding the various embodiments of the present disclosure.

[Touch Sensing System]

Figure 10:
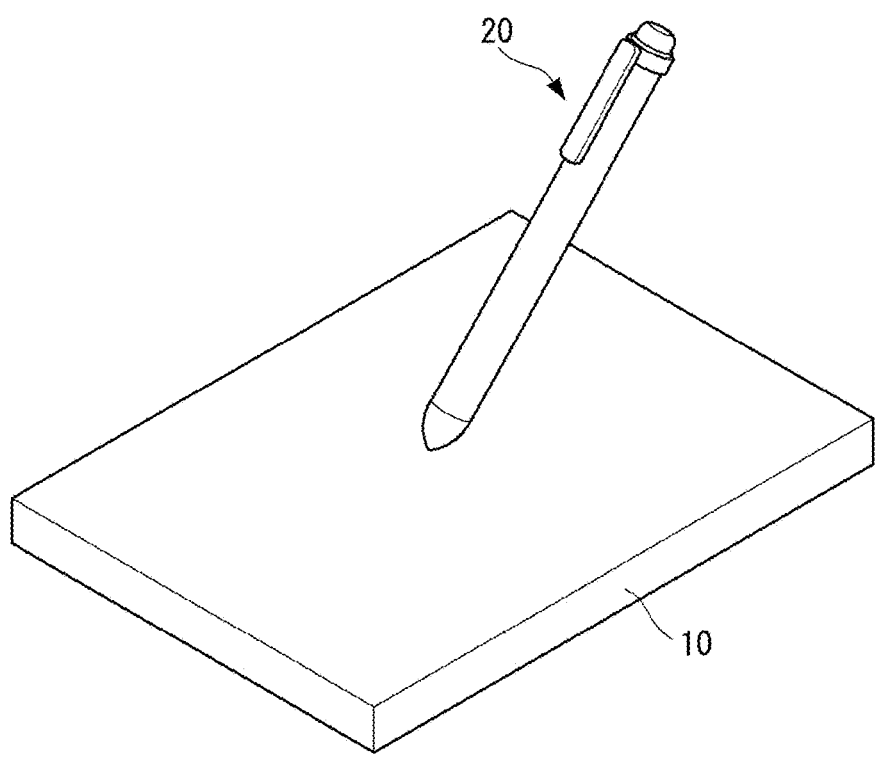
FIG. 10 is a view schematically illustrating a touch sensing system according to an embodiment of the present disclosure.

FIG. 10 is a view schematically illustrating a touch sensing system according to an embodiment of the present disclosure.

Referring to FIG. 10, the touch sensing system according to an embodiment includes a display device 10 and an active stylus pen 20.

The display device 10 has a display function and a touch detection function. The display device 10, allowing for touch detection according to contact of a conductive object such as a finger and/or the active stylus pen 20, has an integrated capacitive touch screen. Here, the touch screen may be configured independently from a display panel for implementing display, or may be installed in a pixel array of the display panel. A touch screen driving signal is applied to the touch screen. The touch screen driving signal includes an uplink signal for synchronization with the active stylus pen 20 and a touch sensor driving signal for sensing a touch input applied to the touch screen. A specific configuration and operation of the display device 10 will be described with reference to FIGS. 11 to 15 hereinafter.

The active stylus pen 20 generates a pen driving signal synchronized with the touch sensor driving signal on the basis of the uplink signal received by the touch screen and outputs the pen driving signal to a contact point of the touch screen to allow a pen touch input to be easily detected on the touch screen. In particular, the active stylus pen 20 further include a conductor layer on an outer surface of a housing, and by connecting the conductor layer to a pen driving circuit, even when a palm touches the touch screen, a reception path regarding the touch screen driving signal may be secured and the pen driving circuit may easily receive an uplink signal. A switch may be provided between the conductor layer and the pen driving circuit and turned on and off according to conditions. A configuration of the active stylus pen 20 and a scheme of enhancing uplink signal detection performance (or sensing performance) will be described with reference to FIGS. 16 to 20 hereinafter.

The touch sensing system senses a position of a touch input by a conductive object by analyzing touch row data according to the touch sensor driving signal and the pen driving signal on the touch screen. The touch sensing system according to an embodiment may simultaneously sense a finger touch input by a finger and a pen touch input by the active stylus pen 20. The finger touch input may be sensed on the basis of an analysis result of the touch row data according to the touch sensor driving signal, and the pen touch input may be sensed on the basis of an analysis result of touch row data according to the pen driving signal. In the touch sensing system, the pen driving signal and the touch sensor driving signal have the same phase and a magnitude (pulse amplitude) of the pen driving signal is set to be greater than that of the touch sensor driving signal, whereby the touch row data of the position that the pen has touched and the touch row data of the position that the finger has touched are differentiated to easily distinguish between the pen touch input and the finger touch input.

[Display Device]

Figure 11:
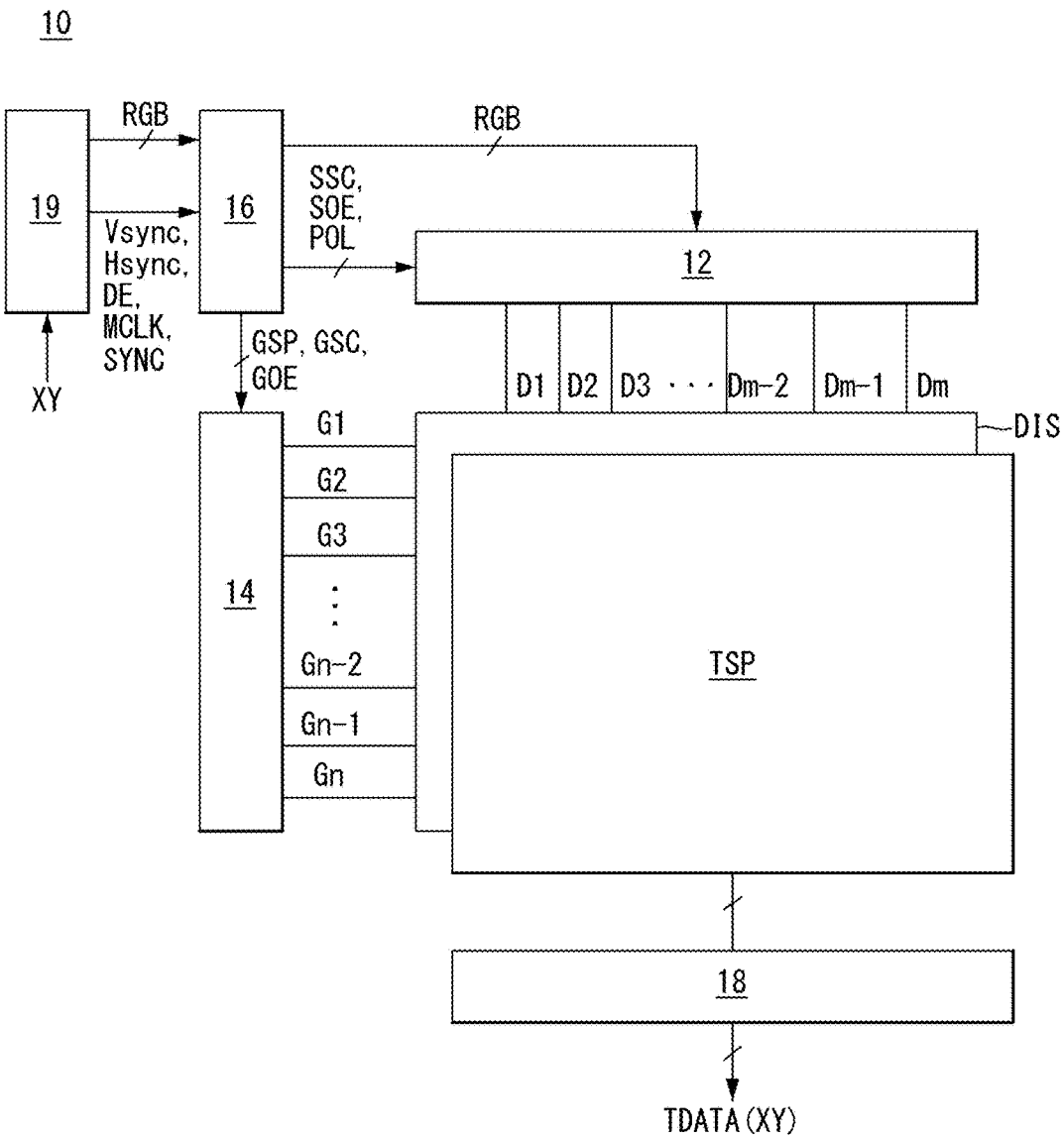
FIG. 11 is a view illustrating a display device to which a touch sensing system according to an embodiment of the present disclosure is applied.
Figure 12:
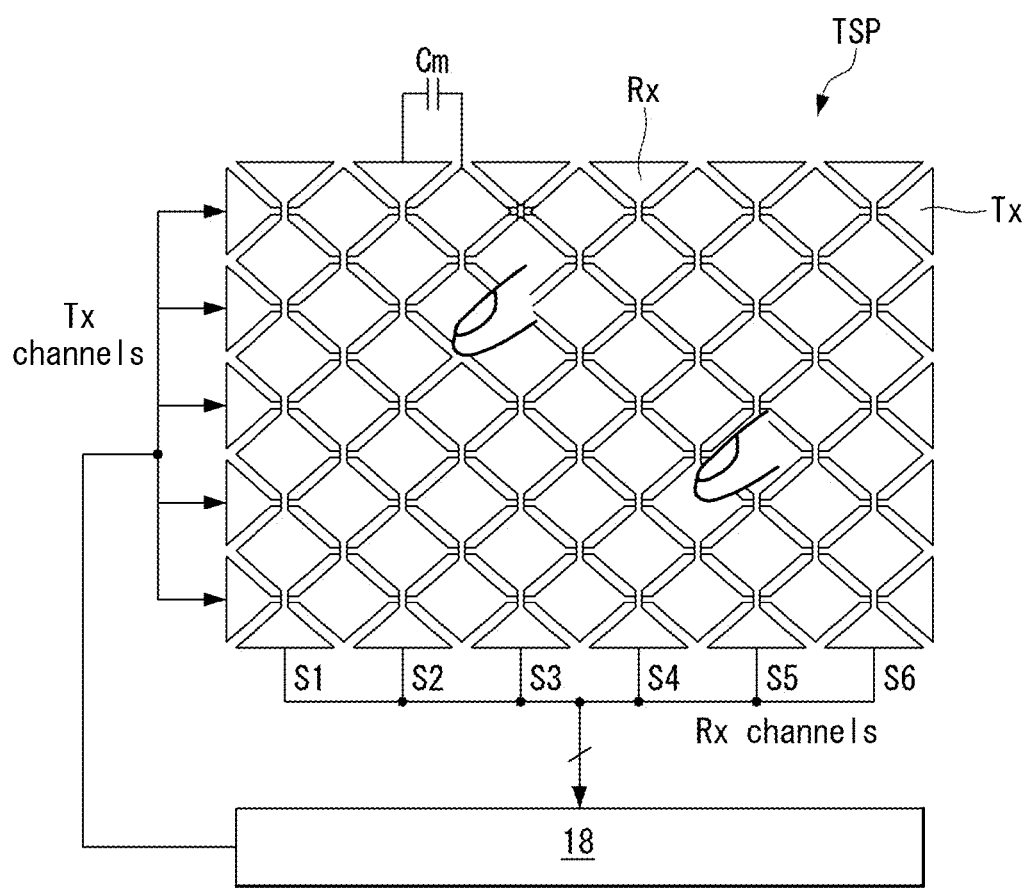
FIG. 12 is a view illustrating an example of a touch screen implemented by a mutual capacitance sensor.
Figure 13:
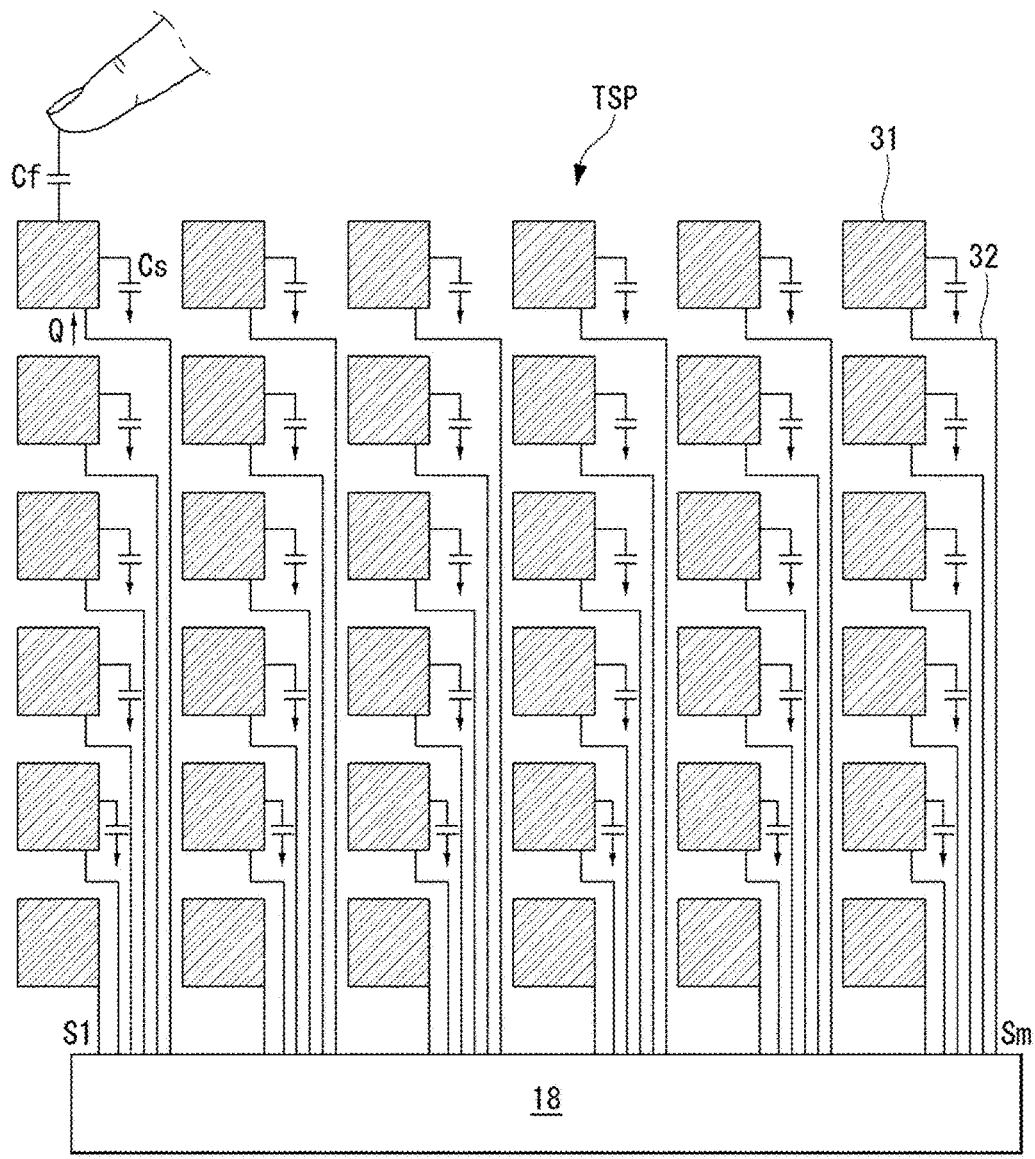
FIG. 13 is a view illustrating an example of a touch screen implemented by a self-capacitance sensor.
Figure 14:
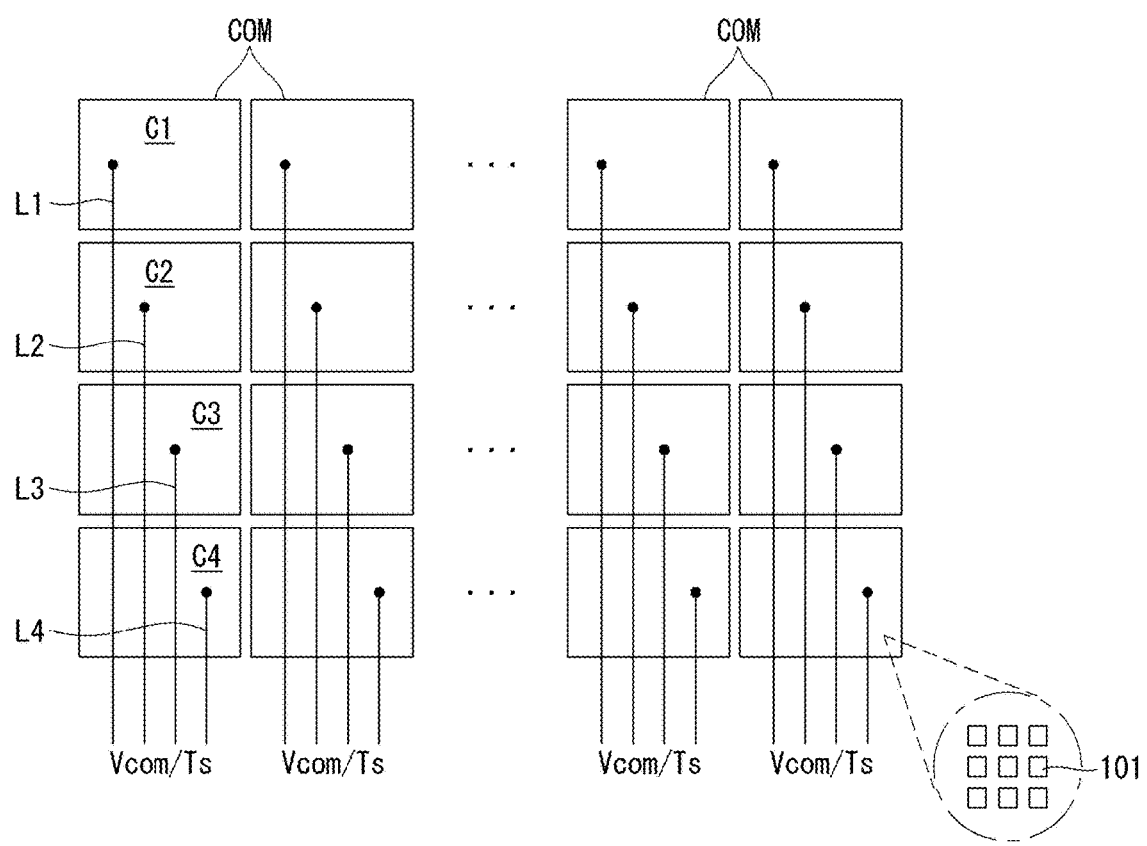
FIG. 14 is a view illustrating an example of a touch sensor installed in a pixel array.
Figure 15:
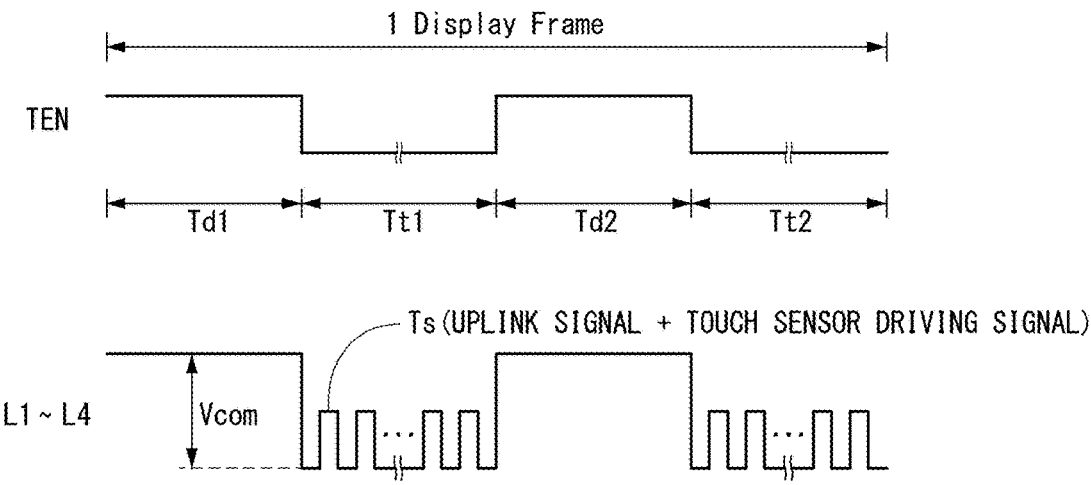
FIG. 15 is a timing diagram illustrating a method for driving pixels and touch sensors of a display panel in a time-division manner.

FIG. 11 illustrates a display device to which a touch sensing system according to an embodiment of the present disclosure is applied. FIG. 12 illustrates an example of a touch screen implemented by a mutual capacitance sensor. FIG. 13 illustrates an example of a touch screen implemented by a self-capacitance sensor. FIG. 14 illustrates an example of a touch sensor installed in a pixel array. FIG. 15 illustrates a method for driving pixels and touch sensors of a display panel in a time-division manner.

Referring to FIGS. 11 to 15, the display device 10 according to an embodiment may be implemented on the basis of a flat display device such as a liquid crystal display (LCD), a field emission display (FED), a plasma display panel (PDP), an organic light emitting display device, an electrophoresis display, and the like. In the embodiment described hereinafter, the display device implemented as an LCD will be described, but the display device of the present disclosure is not limited thereto.

The display device 10 includes a display module and a touch module.

The touch module included in the display device 10 includes a touch screen TSP and a touch driving device 18.

The touch screen TSP may be implemented as a capacitive touch screen sensing a touch input through a plurality of capacitance sensors. The touch screen TSP includes a plurality of touch sensors having capacitance. Capacitance may be classified as self-capacitance and mutual capacitance. The self-capacitance may be formed along a conductor line of a single layer formed in one direction. The mutual capacitance may be formed between two conductor lines perpendicular to each other.

As illustrated in FIG. 12, the touch screen TSP implemented by mutual capacitance sensors Cm may include Tx electrode lines, Rx electrode lines intersecting with the Tx electrode lines, and touch sensors Cm formed at intersections of the Tx electrode lines and the Rx electrode lines. The Tx electrode lines are driving signal lines supplying electric charges to the touch sensors by applying a touch sensor driving signal (and/or a pen driving signal) to the touch sensors Cm. The Rx electrode lines are sensor lines connected to the touch sensors Cm and supplying electric charges of the touch sensors Cm to the touch driving device 18. In a mutual capacitance sensing method, electric charges are supplied to the touch sensor Cm by applying the touch sensor driving signal (and/or the pen driving signal) to the Tx electrodes through the Tx electrode lines, and a change in capacitance of the touch sensors Cm is sensed through Rx electrodes and the Rx electrode lines in synchronization with the touch sensor driving signal (and/or the pen driving signal, whereby a touch input by a conductive object may be recognized.

As illustrated in FIG. 13, in a touch screen TSP implemented by self-capacitance sensors Cs, electrodes 31 may be connected to sensor lines 32 formed in one direction, respectively. The self-capacitance sensors Cs include capacitance formed in each of the electrodes 31. In a self-capacitance sensing method, when a touch sensor driving signal (and/or the pen driving signal) is applied to the electrodes 31 through the sensor lines 32, electric charges Q are accumulated in the touch sensors Cs. Here, when a finger (or an active stylus pen) touches the electrode 31, parasitic capacitance Cf is additionally connected to the self-capacitance sensor Cs, causing a total capacitance value to be changed. When a capacitance value of a sensor touched by a conductive object and that of a sensor which is not touched are different, an amount of electric charges sensed by the touch sensors is changed, whereby whether a touch has been applied may be determined.

The touch screen TSP may be bonded to an upper polarizer of a display panel DIS or may be provided between the upper polarizer of the display panel DIS and an upper substrate. Also, the touch sensors Cm or Cs of the touch screen TSP may be installed in a pixel array of the display panel DIS.

An example in which the touch screen TSP is installed in a pixel array of the display panel DIS is illustrated in FIG. 14. Referring to FIG. 14, a pixel array of the display panel DIS includes touch sensors C1 to C4 and sensor lines L1 to Li (i is a positive integer smaller than m and n). A common electrode COM of pixel electrodes 101 is divided into a plurality of segments. The touch sensors C1 to C4 are implemented as divided common electrodes COM. A single common electrode segment is commonly connected to a plurality of pixels 101 and forms a single touch sensor. Thus, as illustrated in FIG. 15, the touch sensors C1 to C4 supply a common voltage Vcom to the pixels 101 during display sections Td1 and Td2, and sense a touch input upon receiving a touch screen driving signal Ts (or a pen driving signal) during touch periods Tt1 and Tt2. As mentioned above, the touch screen driving signal Ts includes an uplink signal and a touch sensor driving signal. The pen driving signal is a signal synchronized with the touch sensor driving signal on the basis of the uplink signal.

The touch driving device 18 applies the touch screen driving signal Ts to the touch sensors C1 to C4 and senses a variation of electric charges of the touch sensors C1 to C4 to determine whether a conductive object has touched and a position thereof.

In response to a touch enable signal TEN input from the timing controller 16 or the host system 19, the touch driving device 18 drives the touch sensors during the touch periods Tt1 and Tt2. The touch driving device 18 senses a touch input applied to the touch sensors C1 to C4 through the sensor lines L1 to Li during the touch periods Tt1 and Tt2. The touch driving device 18 determines a touch input by analyzing a variation in electric charges of the touch sensor varied according to the presence and absence of a touch input, and calculates coordinates of the touch input position. Coordinates information of the touch input position is transmitted to a host system.

The touch driving device 18 drives the touch sensors C1 to C4 in response to the touch enable signal TEN during the touch periods Tt1 and Tt2, and here, the touch driving device 18 may allocate at least two touch frames for driving the touch sensors C1 to C4 within 1 display frame period displaying an input image to thereby increase a touch report rate to be higher than a display frame rate.

For example, when the display sections Td1 and Td2 and the touch periods Tt1 and Tt2 within 1 frame period are divided into a plurality of sections as illustrated in FIG. 15, the touch driving device 18 senses a touch input at every touch period Tt1 and Tt2 and transmits coordinates information of the touch input to the host system at a timing when each touch frame is completed. Thus, in the present disclosure, the touch report rate may be increased to be higher than the display frame rate. The display frame rate is a frame frequency at which 1 frame image is written into a pixel array. The touch report rate is a rate at which coordinates information of a touch input is produced. As the touch report rate is higher, a coordinates recognition rate of a touch input is increased to improve touch sensitivity.

The display module included in the display device 10 may include a display panel DIS, display driving circuits 12, 14, and 16, and a host system 19.

The display panel DIS includes a liquid crystal layer formed between two substrates. A pixel array of the display panel DIS includes pixels formed in a pixel region defined by data lines D1 to Dm (m is a positive integer) and gate lines G1 to Gn (n is a positive integer). Each of the pixels may include a thin film transistor (TFT) formed at each of intersections of the data lines D1 to Dm and the gate lines G1 to Gn, a pixel electrode charging a data voltage, a storage capacitor connected to the pixel electrode to maintain a voltage of a liquid crystal cell, and the like.

A black matrix, a color filter, and the like, may be formed on an upper substrate of the display panel DIS. A lower substrate of the display panel DIS may have a color filter on TFT (COT) structure. Here, the black matrix and the color filter may be formed on the lower substrate of the display panel DIS. A common electrode to which a common voltage is supplied may be formed on the upper substrate or the lower substrate of the display panel DIS. A polarizer is attached to the upper substrate and the lower substrate of the display panel DIS, and an alignment film for setting a pre-tilt angle of liquid crystal is formed on an inner surface in contact with liquid crystal. A columnar spacer for maintaining a cell gap of a liquid crystal cell is formed between the upper substrate and the lower substrate of the display panel DIS.

A backlight unit may be disposed below a lower surface of the display panel DIS. The backlight unit may be implemented as an edge type backlight unit or a direct type backlight unit to irradiate light to the display panel DIS. The display panel DIS may be implemented in any known liquid crystal mode such as a twisted nematic (TN) mode, a vertical alignment (VA) mode, an in-plane switching (IPS) mode, a fringe field switching (FFS) Mode, and the like.

The display driving circuit including the data driving circuit 12, the gate driving circuit 14, and the timing controller 16 writes video data of an input image into pixels of the display panel DIS. The data driving circuit 12 converts digital video data RGB input from the timing controller 16 into an analog positive polarity/negative polarity gamma compensation voltage to output a data voltage. The data voltage output from the data driving circuit 12 is supplied to the data lines D1 to Dm. The gate driving circuit 14 sequentially supplies a gate pulse (or a scan pulse) synchronized with the data voltage to the gate lines G1 to Gn to select a pixel line of the display panel DIS into which the data voltage is written. The gate driving circuit 14 may be disposed together with pixels on the substrate of the display panel DIS.

Receiving timing signals such as a vertical synchronization signal Vsync, a horizontal synchronization signal Hsync, a data enable signal DE, a main clock MCLK, and the like, from the host system 19, the timing controller 16 synchronizes operation timing of the data driving circuit 12 and the gate driving circuit 14. A scan timing control signal includes a gate start pulse (GSP), a gate shift clock (GSC), a gate output enable signal (GOE), and the like. A data timing control signal includes a source sampling clock (SSC), a polarity control signal (POL), a source output enable signal (SOE), and the like.

The host system 19 may transmit the timing signals Vsync, Hsync, DE, and MCLK, together with the digital video data RGB, to the timing controller 16, and execute an application program associated with touch coordinates information XY input from the touch driving device 18.

A touch enable signal TEN of FIG. 15 may also be generated by the host system 19. During the display sections Td1 and Td2, the data driving circuit 12 supplies a data voltage to the data lines D1 to Dm under the control of the timing controller 16, and the gate driving circuit 14 sequentially supplies a gate pulse synchronized with the data voltage to the gate lines G1 to Gn under the control of the timing controller 16. During the display sections Td1 and Td2, the touch driving device 18 stops an operation.

During the touch periods Tt1 and Tt2, the touch driving device 18 applies a touch screen driving signal Ts to the touch sensors of the touch screen TSP. During the touch periods Tt1 and Tt2, the display driving circuits 12, 14, and 16 may supply an AC signal having the same amplitude and the same phase as that of the touch screen driving signal Ts to the signal lines D1 to Dm and G1 to Gm in order to minimize parasitic capacitance between the signal lines D1 to Dm and G1 to Gn connected to the pixels and the touch sensors. In this case, display noise mixed with the touch sensing signal is significantly reduced and accuracy of touch sensing is increased.

[Stylus Pen]

Figure 16:
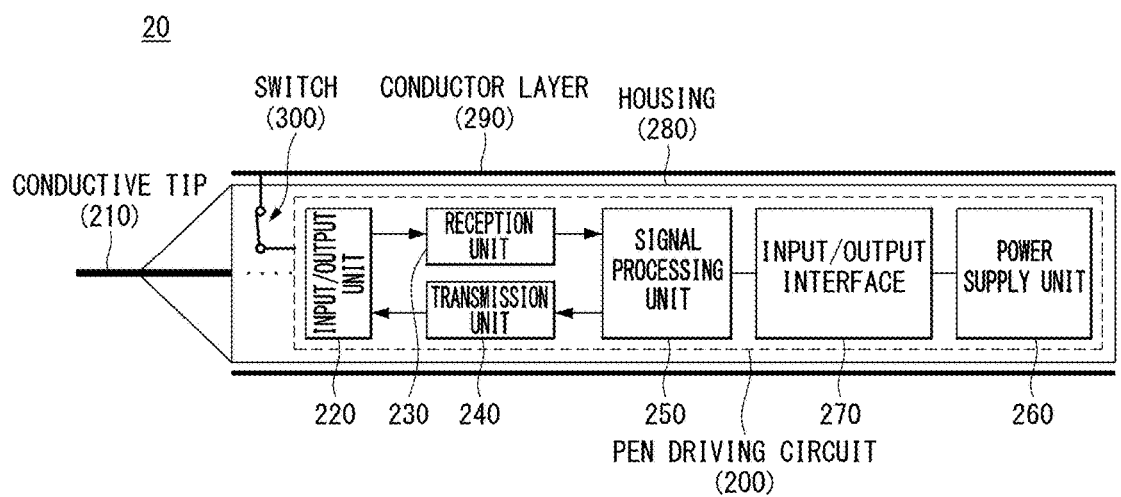
FIG. 16 is a view schematically illustrating a configuration of an active stylus pen according to an embodiment of the present disclosure.

FIG. 16 is a view schematically illustrating a configuration of the active stylus pen 20 according to an embodiment of the present disclosure.

Referring to FIG. 16, the active stylus pen 20 includes a pen driving circuit 200, a conductive tip 210, a housing 280, a conductor layer 290, and a switch 300. The pen driving circuit 200 includes an input/output unit 220, a reception unit 230, a transmission unit 240, a signal processing unit 250, a power supply unit 260, and an input/output interface 270.

The conductive tip 210 is formed of a conductive material such as a metal, or the like, and protrudes outwardly from one side of the housing 280 to serve as an input/output electrode. Since the conductive tip 210 serves as an input/output electrode, a structure of the active stylus pen 20 is advantageously simplified. When the conductive tip 210 touches the touch screen TSP of the display device 10, the conductive tip 210 is coupled to the touch screen TSP in the contact point. The conductive tip 210 receives a touch screen driving signal from the touch screen TSP at the contact point, and outputs a pen driving signal produced within the active stylus pen 20 to the contact point of the touch screen TSP.

When the conductive tip 210 touches the touch screen TSP of the display device 10, the input/output unit 220 electrically connects the conductive tip 210 and the reception unit 230 during a reception section (see FIG. 20) of the 1 touch period, and electrically connects the conductive tip 210 and the transmission unit 240 during a transmission section (see FIG. 20) to thereby temporally separate a reception timing of the touch screen driving signal and a transmission timing of the pen driving signal.

The reception unit 230, including at least one amplifier and at least one comparator, digitally processes the touch screen driving signal input through the input/output unit 220 during the reception section (see FIG. 20) of the 1 touch period.

The signal processing unit 250 analyzes a pattern (i.e., a pulse duty, the number of pulses, and the like) of an uplink signal included in the digitally processed touch screen driving signal to check validity of the touch screen driving signal. When a normal uplink signal is detected, the signal processing unit 250 determines that the touch screen driving signal is valid, and generates a pen driving signal PS synchronized with a touch sensor driving signal included in the touch screen driving signal. The signal processing unit 250 may refer to signal generation conditions (period, duty, number, and the like) of a default parameter set installed to generate the pen driving signal PS synchronized with the touch sensor driving signal. The signal processing unit 250 outputs the digital level pen driving signal to the transmission unit 240.

The transmission unit 240, including a level shifter, converts the pen driving signal from the digital level to an analog level. The transmission unit 240 outputs the level-shifted pen driving signal to the conductive tip 210 through the input/output unit 220 during the transmission section (see FIG. 20) of the 1 touch period.

The power supply unit 260 generates power required for an operation of the pen driving circuit 200. The input/output interface 270 may be connected to the power supply unit 260 according to a button pressing operation of a user to supply power required for the reception unit 230, the transmission unit 240, and the signal processing unit 250.

The housing 280 is connected to a ground GND and cases the pen driving circuit 200.

The conductor layer 290 surrounds an outer surface of the housing 280, and an insulator is positioned between the conductor layer 290 and the housing 280. The conductor layer 290 is used as a reception path for receiving a touch screen driving signal from the touch screen together with the conductive tip 210. Even when a palm touches the touch screen, the conductor layer 290 may secure a reception path regarding the touch screen driving signal and reliably transfer an uplink signal from the pen driving circuit 200.

[Scheme for Blocking External Noise and Enhancing Detection Performance Regarding Uplink Signal]

Figure 17:
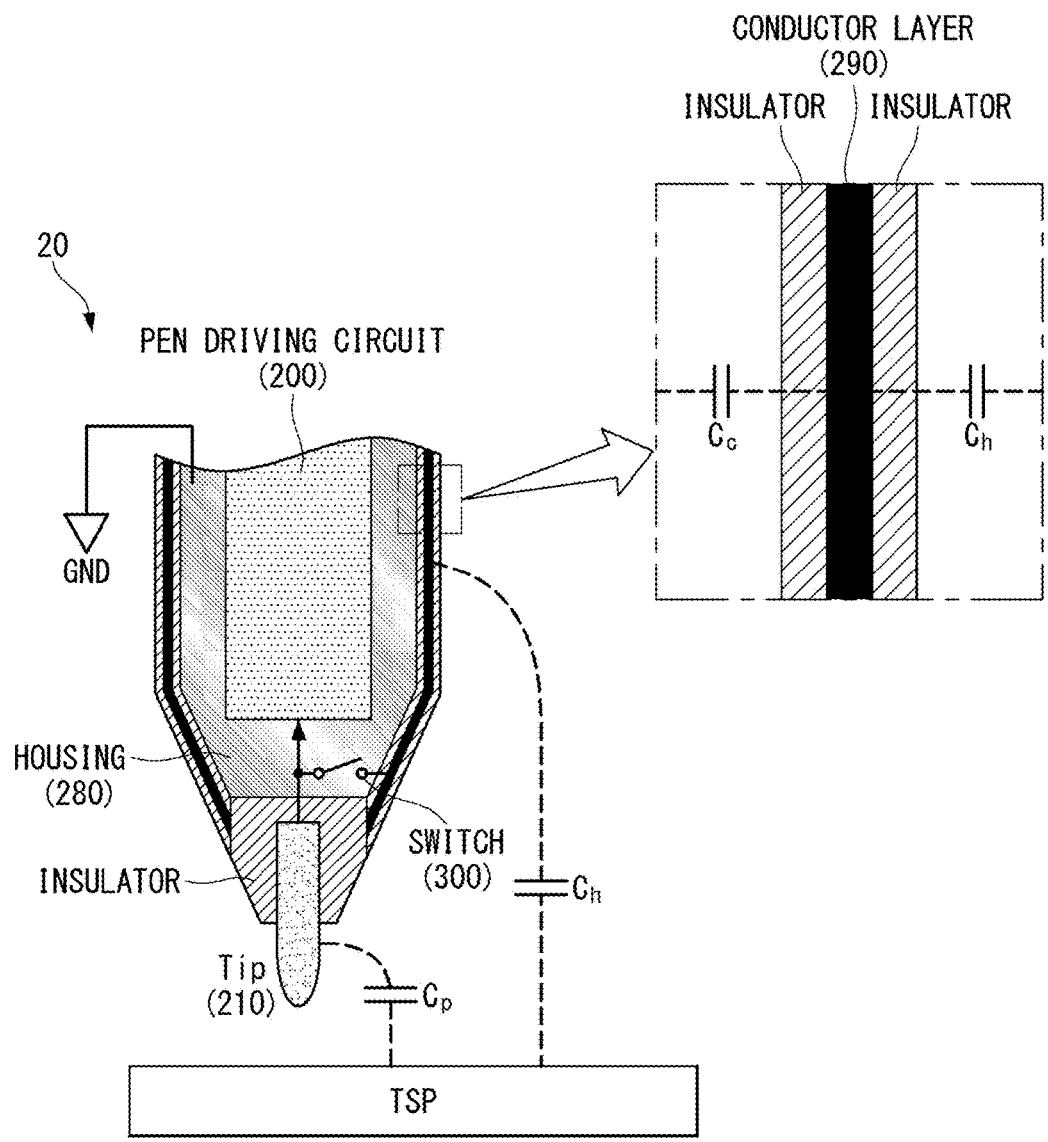
FIG. 17 is a view illustrating major components of an active stylus pen insensitive to external noise and enhancing detection performance (or sensing performance) with respect to an uplink signal.
Figure 18:
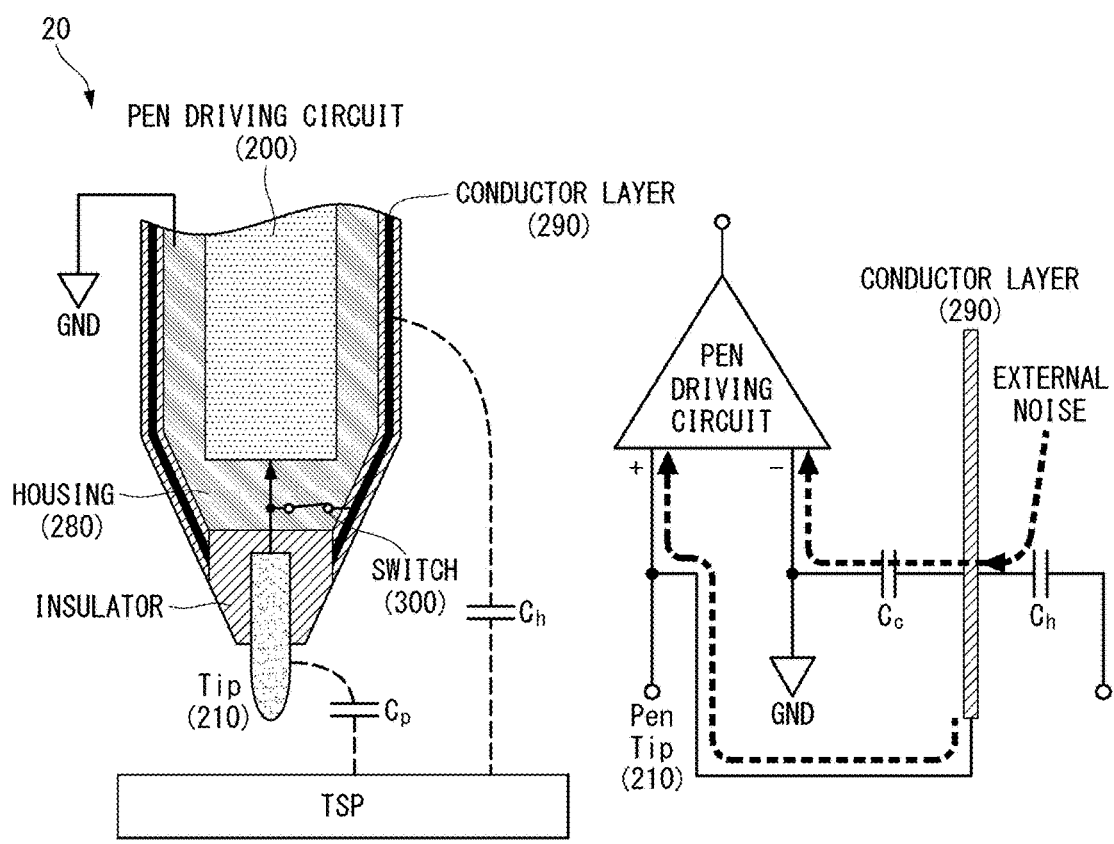
FIG. 18 is a view illustrating a principle of canceling out external noise by a conductor layer provided in an active stylus pen.

FIG. 17 is a view illustrating major components of an active stylus pen insensitive to external noise and enhancing detection performance with respect to an uplink signal. FIG. 18 is a view illustrating a principle of canceling out external noise by a conductor layer provided in an active stylus pen.

Referring to FIG. 17, the active stylus pen 20 according to an embodiment further includes a conductor layer 290 surrounding an outer surface of the housing 280 with an insulator interposed therebetween and a switch 300 connecting the conductor layer 290 and the pen driving circuit 200. The conductive tip 210 is coupled to the touch screen TSP through a pen capacitor Cp, and the conductor layer 290 is coupled to the touch screen TSP through a human capacitor Ch. The pen driving circuit is cased (or housed) by the housing 280, receives an uplink signal and a touch sensor driving signal from the touch screen TSP, generates a pen driving signal synchronized with the touch sensor driving signal, and outputs the generated pen driving signal to the touch screen TSP through the conductive tip 210. Since the pen driving circuit 200 further receives an uplink signal from the conductor layer 290, as well as from the conductive tip 210, even though a magnitude of an uplink signal is attenuated due to an increase in a load (palm contact) of the touch screen TSP, the pen driving circuit 200 may easily receive the uplink signal, compared with the related art.

Figure 1:
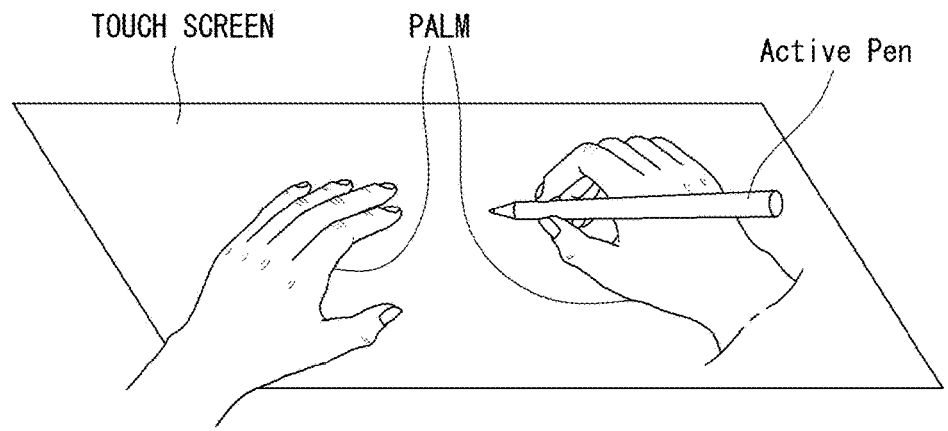
FIG. 1 is a view illustrating a state in which a palm touches a touch screen, together with an active stylus pen, as may be known in the related art.
Figure 2A:
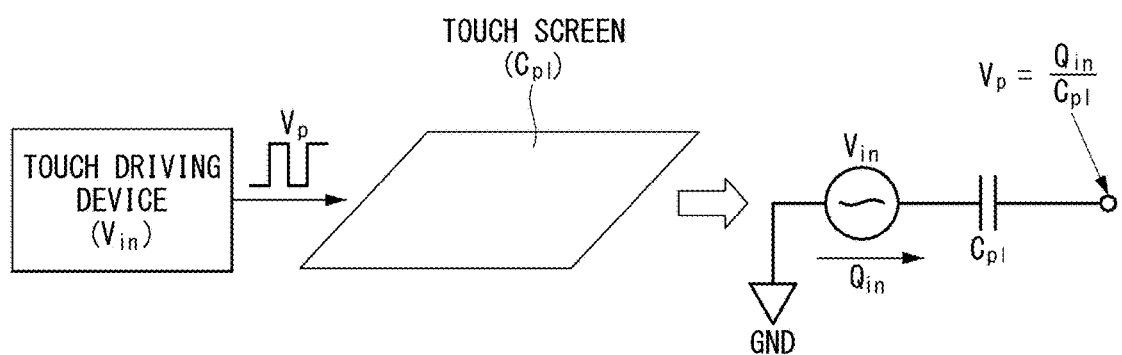
FIGS. 2A, 2B, and 3 are views illustrating an example in which a related art active stylus pen fails to receive an uplink signal.
Figure 2B:
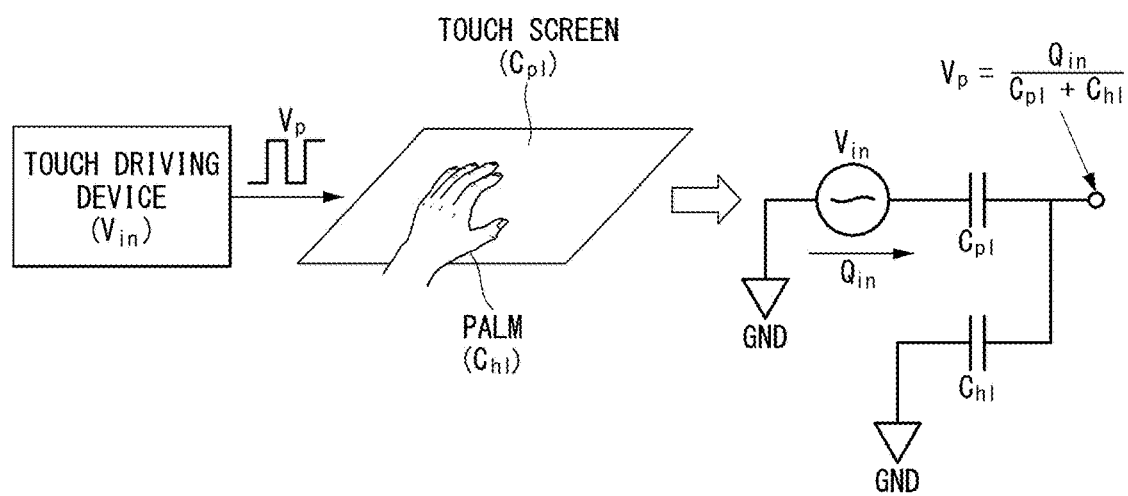
Figure 3:
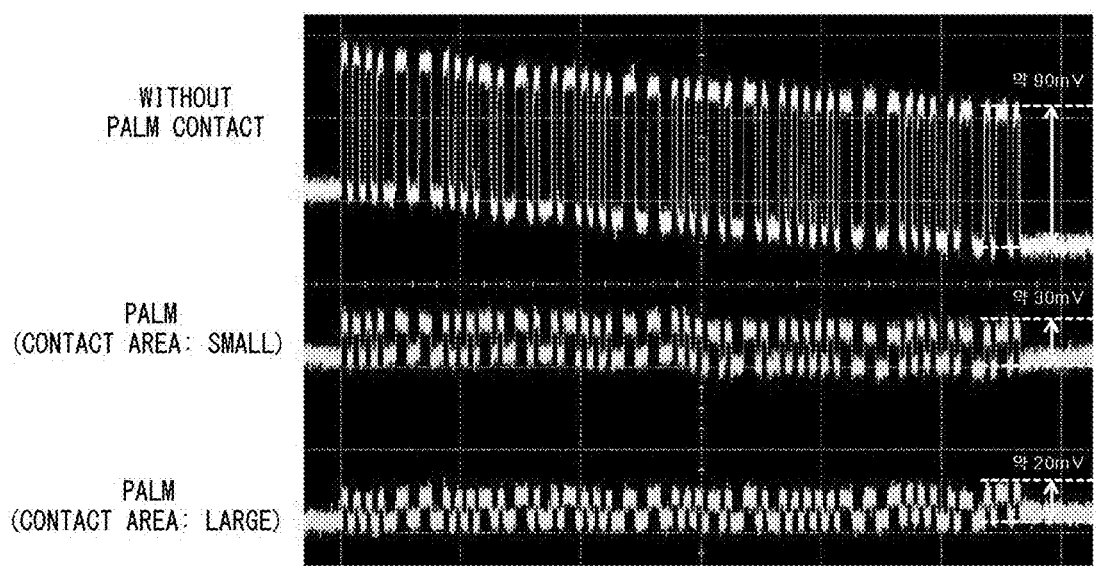
Figure 4:
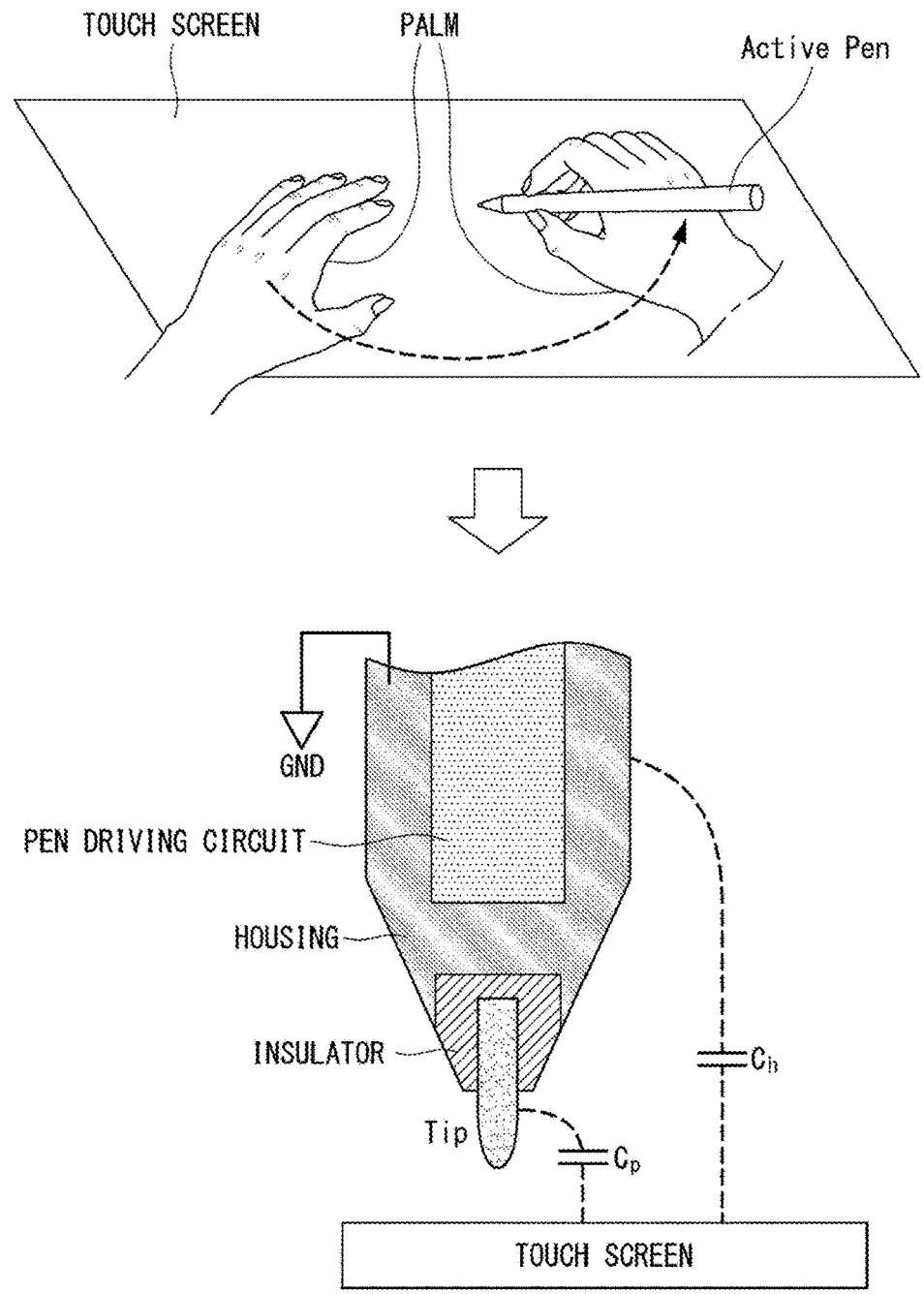

Also, as illustrated in FIG. 17, an insulator may be added to the outer surface of the housing 280 in order of "insulator-conductor layer 290-insulator". In this case, a case capacitor Cc is formed between the housing 280 and the conductor layer 290, and a human capacitor Ch is formed between the conductor layer 290 and the touch screen TSP. In the related art, as illustrated in FIG. 4, when a palm touches the touch screen, an uplink signal of the touch screen is directly transferred to the housing serving as a ground GND through the human capacitor Ch formed between the housing and the touch screen, and thus, the related art active stylus pen was not able to recognize the uplink signal received through the conductive tip due to interference of the uplink signal received through the housing. In contrast, in the present disclosure, since the case capacitor Cc is further provided in addition to the human capacitor Ch between the housing 280 and the touch screen TSP, when a palm touches the touch screen TSP, an amount of the uplink signal directly transferred to the housing 280 is reduced by "Cc/(Cc+Ch)". Thus, since an influence of the palm touch made on the pen ground GND is reduced, recognition performance of the pen driving circuit 200 regarding the uplink signal is enhanced.

Figure 9:
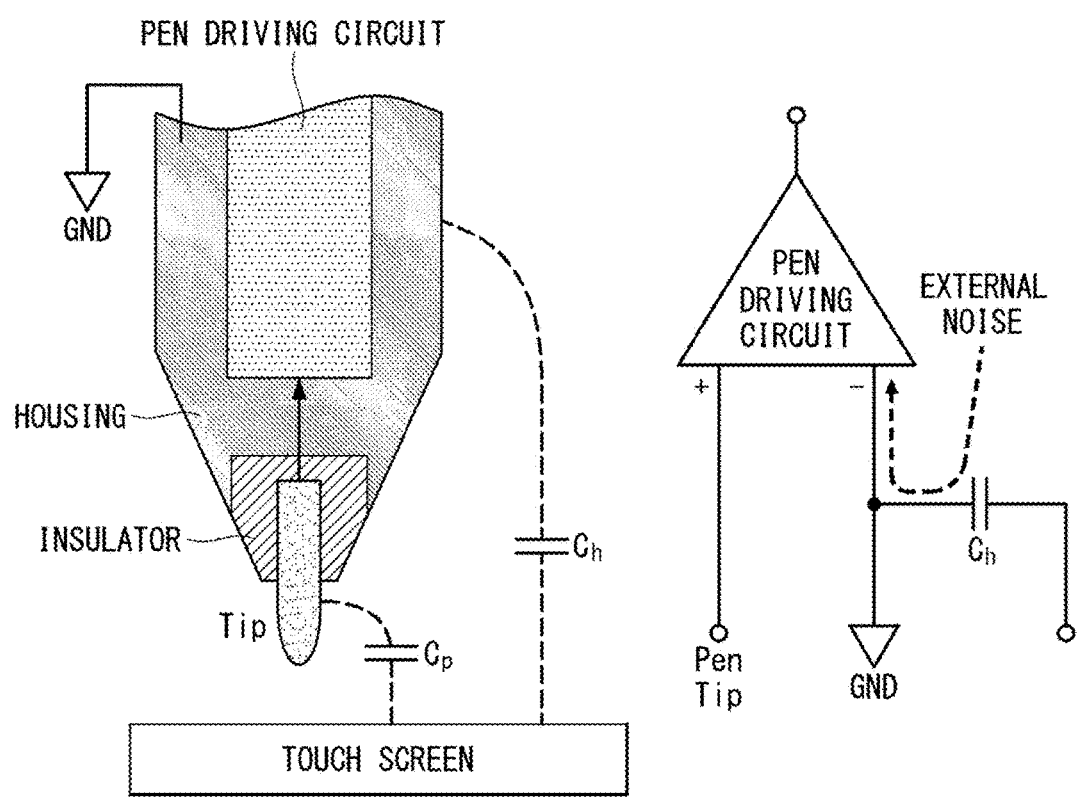
FIG. 9 is a view illustrating the vulnerability to external noise of the related art active stylus pen.

The addition of the conductor layer 290 to the outer surface of the housing 280 as illustrated in FIG. 17 effectively reduces an influence of external noise. Referring to FIG. 18, the reception unit 230 of the pen driving circuit 200 may include an amplifier having a positive (+) input terminal connected to the conductive tip 210 and the conductor layer 290 and a negative (−) input terminal connected to a ground GND. The related art active stylus pen of FIG. 9 has the structure in which external noise is input to the negative (−) input terminal of the amplifier through the housing as is, so an influence of external noise is large. In contrast, in the present disclosure, since the active stylus pen 20 additionally includes the conductor layer 290, external noise is input to the positive (+) input terminal of the amplifier through the human capacitor Ch and the conductor layer 290 and is input to the negative (−) input terminal of the amplifier though the human capacitor Ch and the case capacitor Cc. Thus, the external noise is canceled out in the positive (+) input terminal and the negative (−) input terminal, significantly reducing a value of external noise on the active stylus pen, compared with the related art.

Figure 19A:
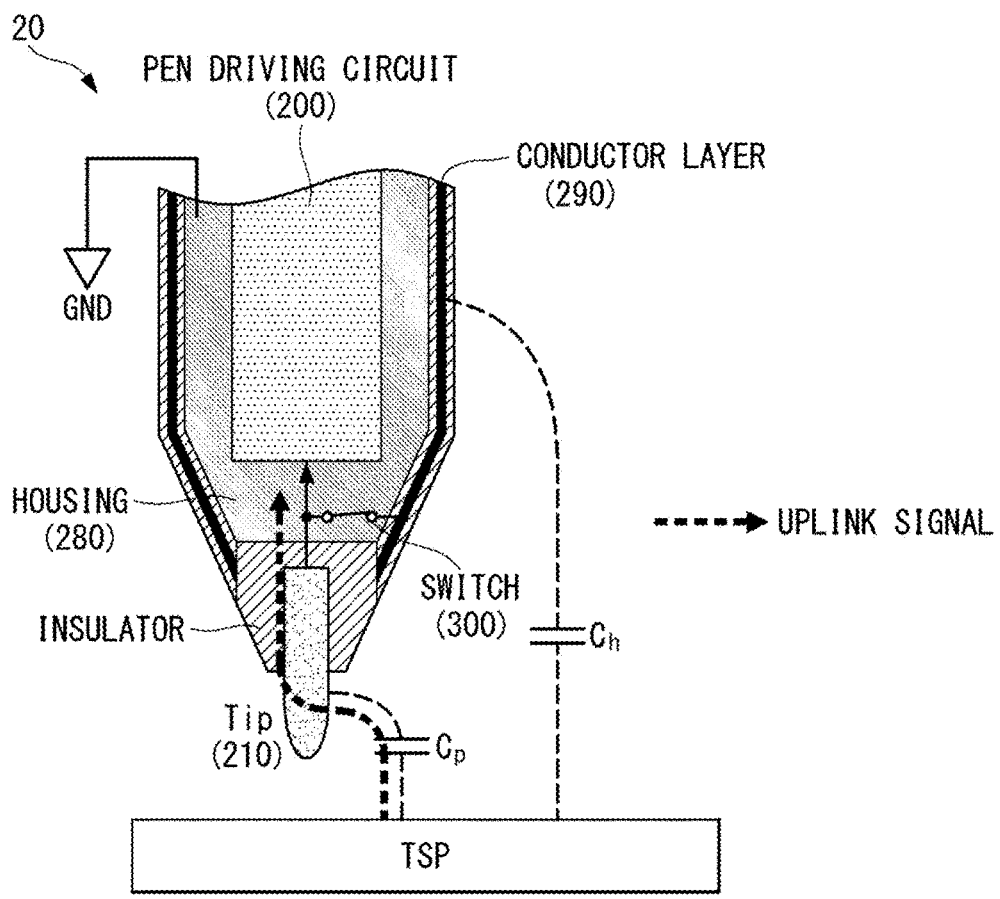
FIGS. 19A and 19B are views illustrating reception paths of an uplink signal in a reception section of one touch period in the presence of palm contact and without palm contact.
Figure 19B:
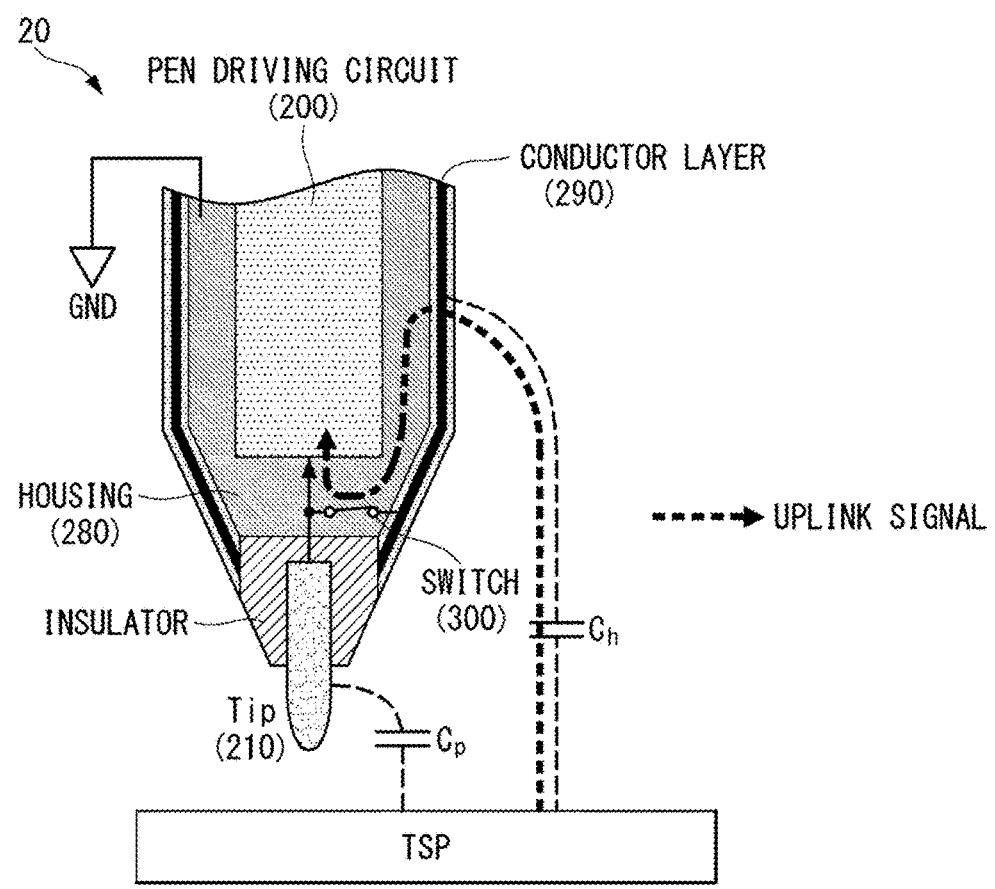
Figure 19C:
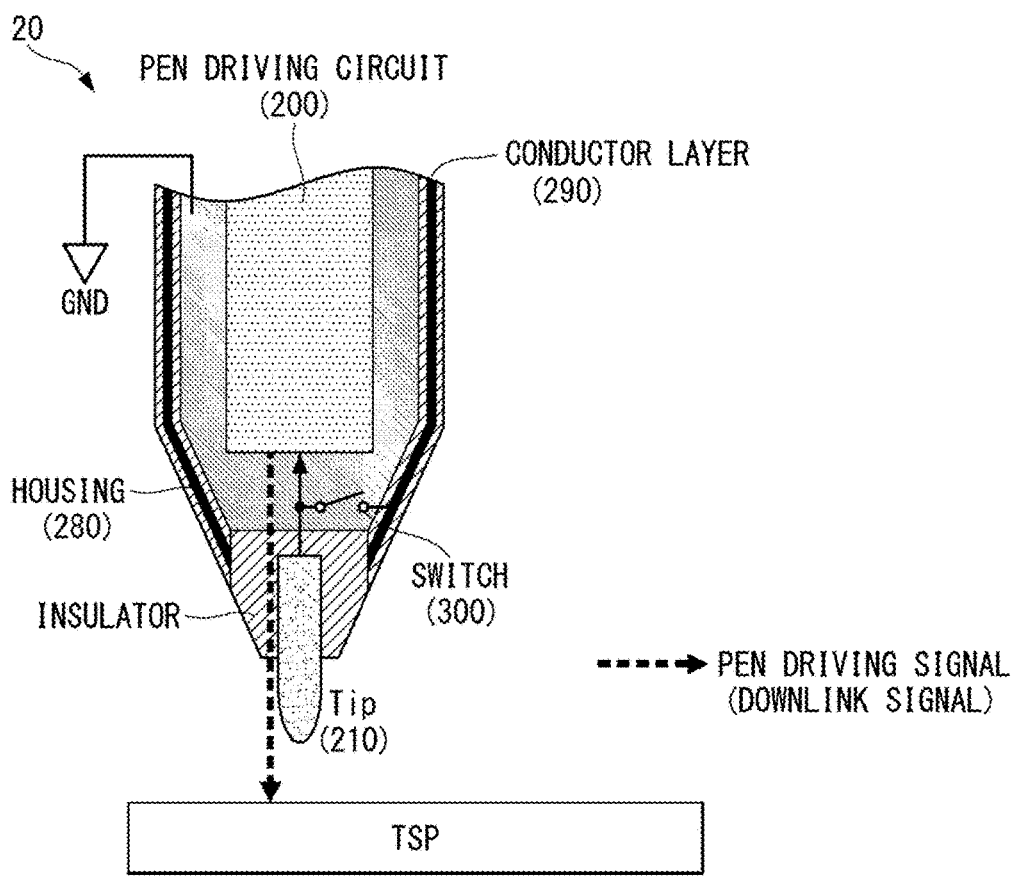
FIG. 19C is a view illustrating a transmission path of a pen driving signal in a transmission section of one touch period.
Figure 20:
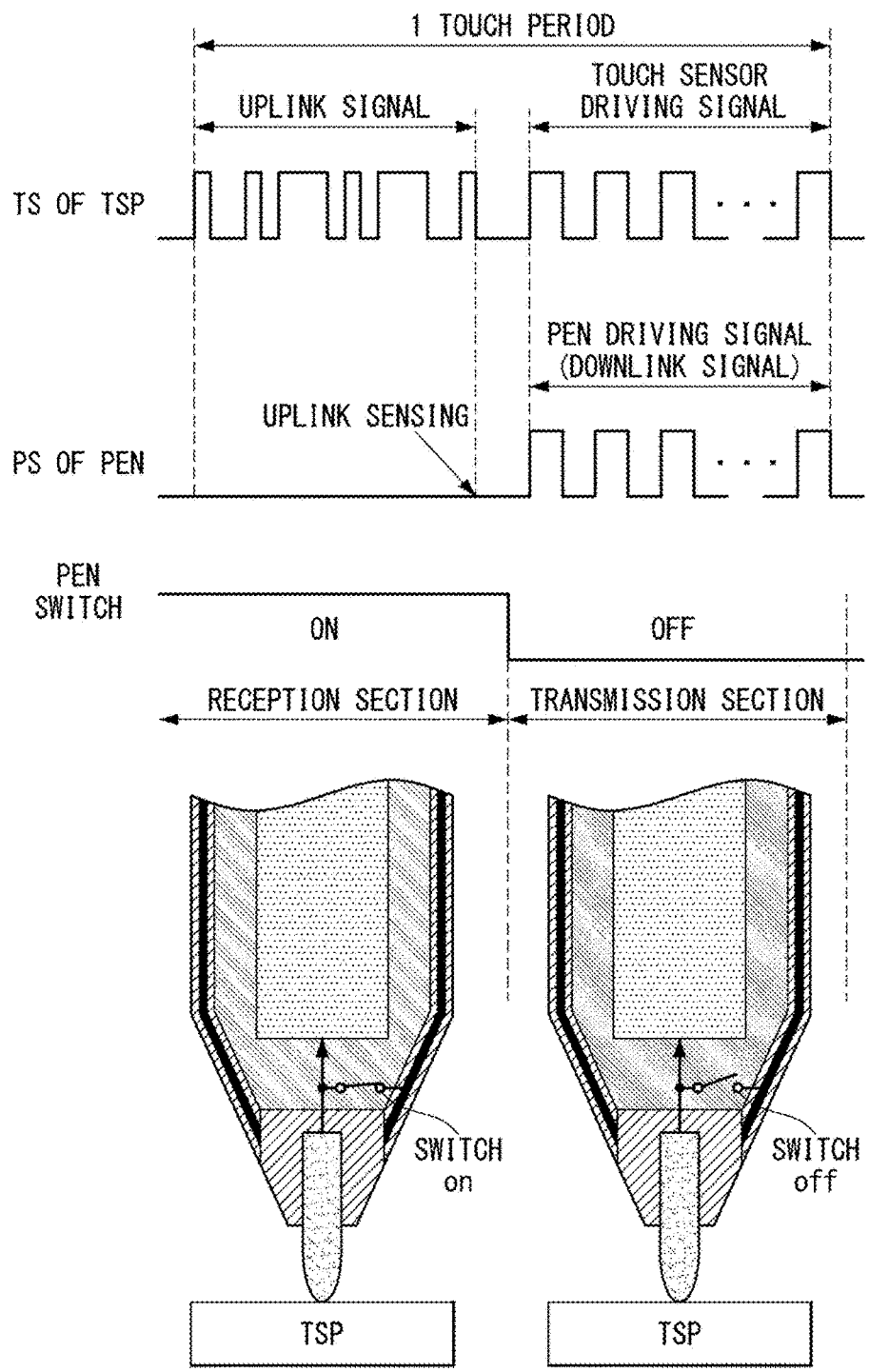
FIG. 20 is a view illustrating an ON/OFF state of a switch in each of a reception section and a transmission section of one touch period.

FIGS. 19A and 19B are views illustrating reception paths of an uplink signal in a reception section of 1 touch period in the presence of palm contact and without palm contact. FIG. 19C is a view illustrating a transmission path of a pen driving signal in a transmission section of 1 touch period. FIG. 20 is a view illustrating an ON/OFF state of a switch in each of a reception section and a transmission section of 1 touch period.

Referring to FIGS. 19A, 19B, and 20, when at least one touch period of 1 frame is allocated to drive the touch screen TSP, the switch 300 is switched on during a reception section for inputting an uplink signal in the touch period to connect the conductor layer 290 and the pen driving circuit 200. In this case, the conductive tip 210 may be coupled to the touch screen TSP through the pen capacitor Cp and the conductor layer 290 may be coupled to the touch screen TSP through the human capacitor Ch.

As illustrated in FIG. 19, in a case in which only the pen (20) touches the touch screen TSP without palm contact in the reception section, the pen driving circuit 200 may be coupled to the touch screen TSP through only the pen capacitor Cp. In this case, the pen driving circuit 200 may receive an uplink signal and a touch sensor driving signal from the touch screen TSP and generate a pen driving signal synchronized with the touch sensor driving signal.

Figure 5:
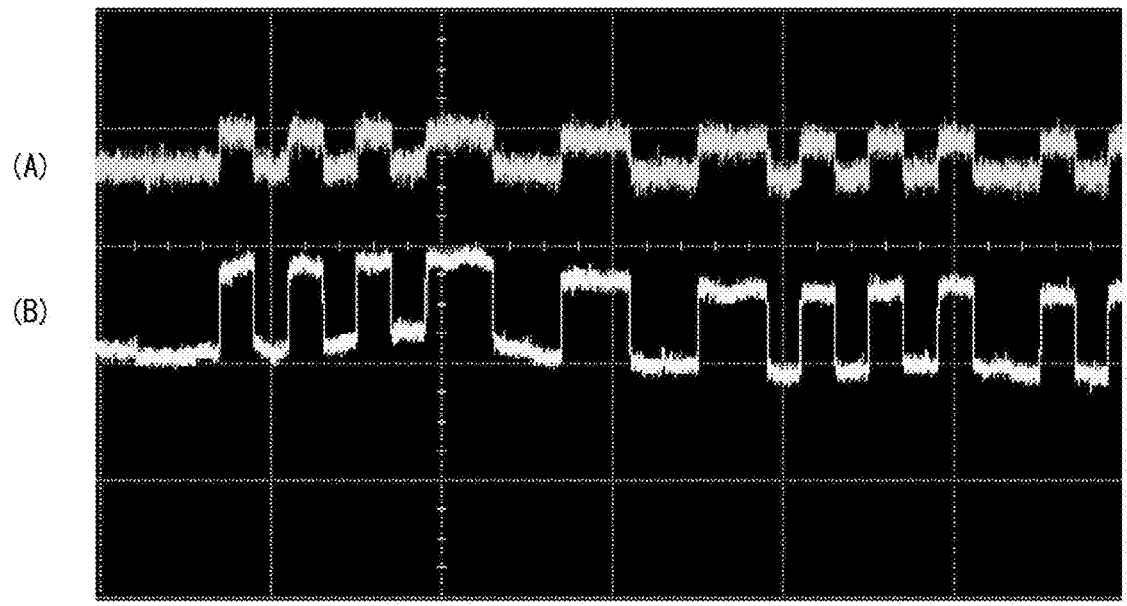
Figure 6A:
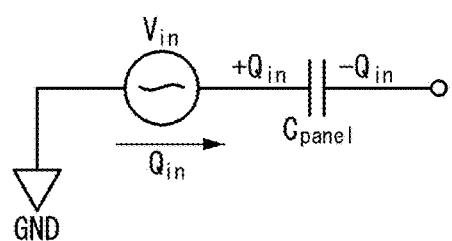
Figure 6B:
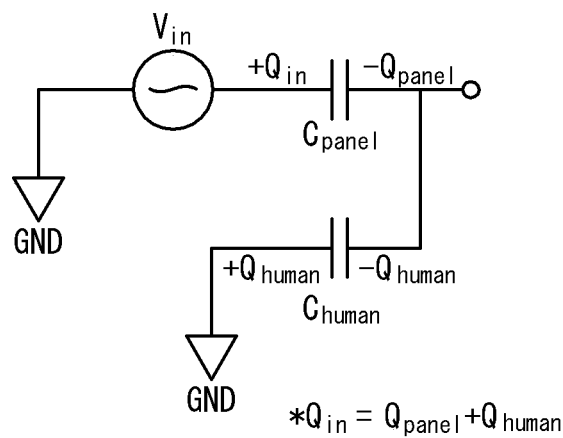
Figure 6C:
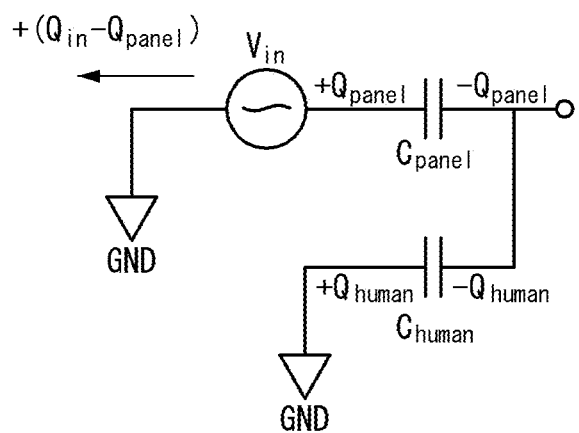

As illustrated in FIG. 19B, in a case in which the pen touches the touch screen TSP, together with palm contact, in the reception section, the pen driving circuit 200 may be coupled to the touch screen TSP through the pen capacitor Cp and the human capacitor Ch. In this case, the human capacitor Ch is much greater than the pen capacitor Cp. Thus, the pen driving circuit 200 receives an uplink signal and a touch sensor driving signal from the touch screen TSP mainly through the human capacitor Ch, and generates a pen driving signal synchronized with the touch sensor driving signal. As described above with reference to FIG. 5, when a palm touches the touch screen TSP, a magnitude of the uplink signal input through the pen capacitor Cp is reduced, making it difficult for the pen driving circuit 200 to recognize the uplink signal. In this case, however, since a magnitude of the uplink signal input through the human capacitor Ch and the switch 300 is increased, the pen driving circuit 200 is able to recognize the uplink signal. Thus, even under the condition that the palm touches the touch screen TSP, the active stylus pen 20 of the present disclosure may easily receive the uplink signal and the touch sensor driving signal and generate the pen driving signal synchronized with the touch sensor driving signal.

Referring to FIGS. 19C and 20, when at least one touch period of 1 frame is allocated to drive the touch screen TSP, the switch 300 is switched off during a transmission section for outputting a pen driving signal in the touch period to release an electrical connection between the conductor layer 290 and the pen driving circuit 200, thus preventing a pen driving signal (a downlink signal) from being dispersed to the conductor layer 290. Due to the OFF operation of the switch 300, sensitivity of the pen driving signal output to the touch screen TSP may be enhanced.

Figure 7:
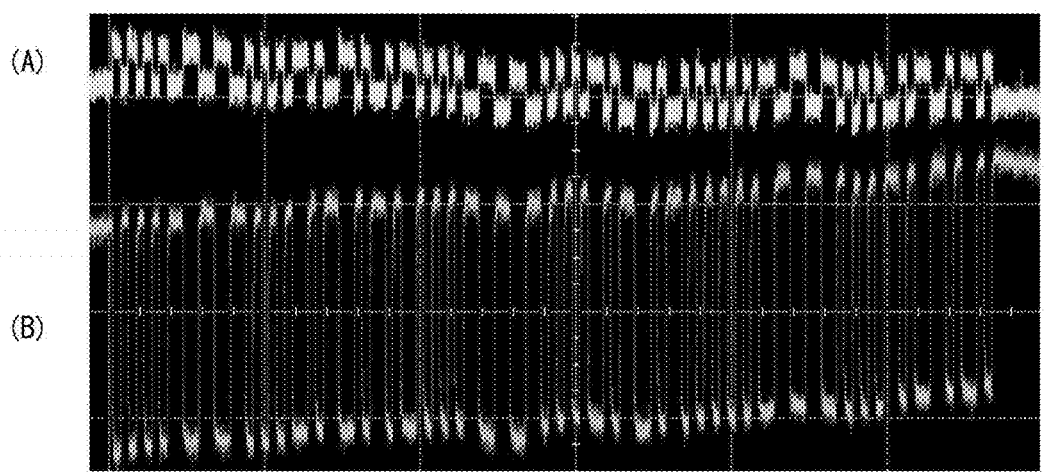
Figure 8B:
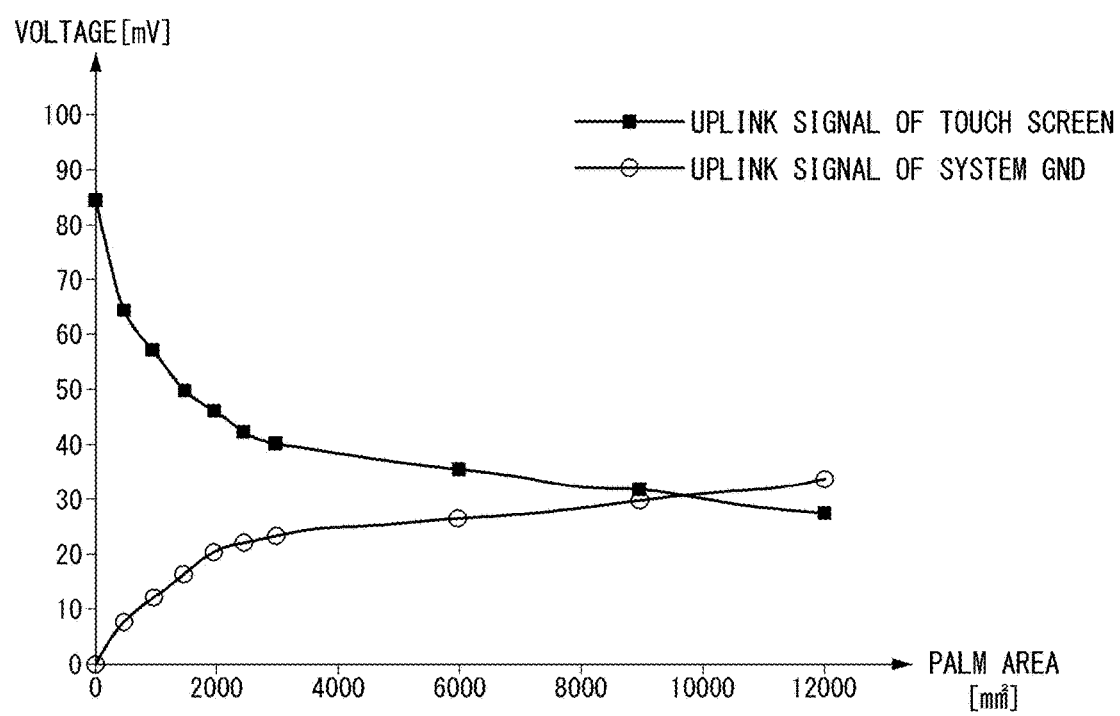

Meanwhile, as described above with reference to FIG. 7, in a case in which the touch screen TSP is in an earth ground GND in which it is not connected to an earth ground GND of the touch sensing system (i.e., when the touch screen TSP is driven by a portable battery), when a palm touches the touch screen TSP, an uplink signal detected from the touch screen TSP may be reduced and a ground waveform of the touch sensing system (i.e., an uplink signal detected from the external case of the touch sensing system) may be increased with respect to the uplink signal in an out-of-phase manner. If the palm touches the external case of the touch sensing system, an out-of-phase uplink signal is transferred to the housing 280 of the stylus pen 20 through the human capacitor Ch and the case capacitor Cc. The out-of-phase uplink signal transferred to the housing 280 of the stylus pen 20 degrades sensing performance of the stylus pen 20 with respect to the uplink signal. The present disclosure proposes a solution as follows.

Figure 21:
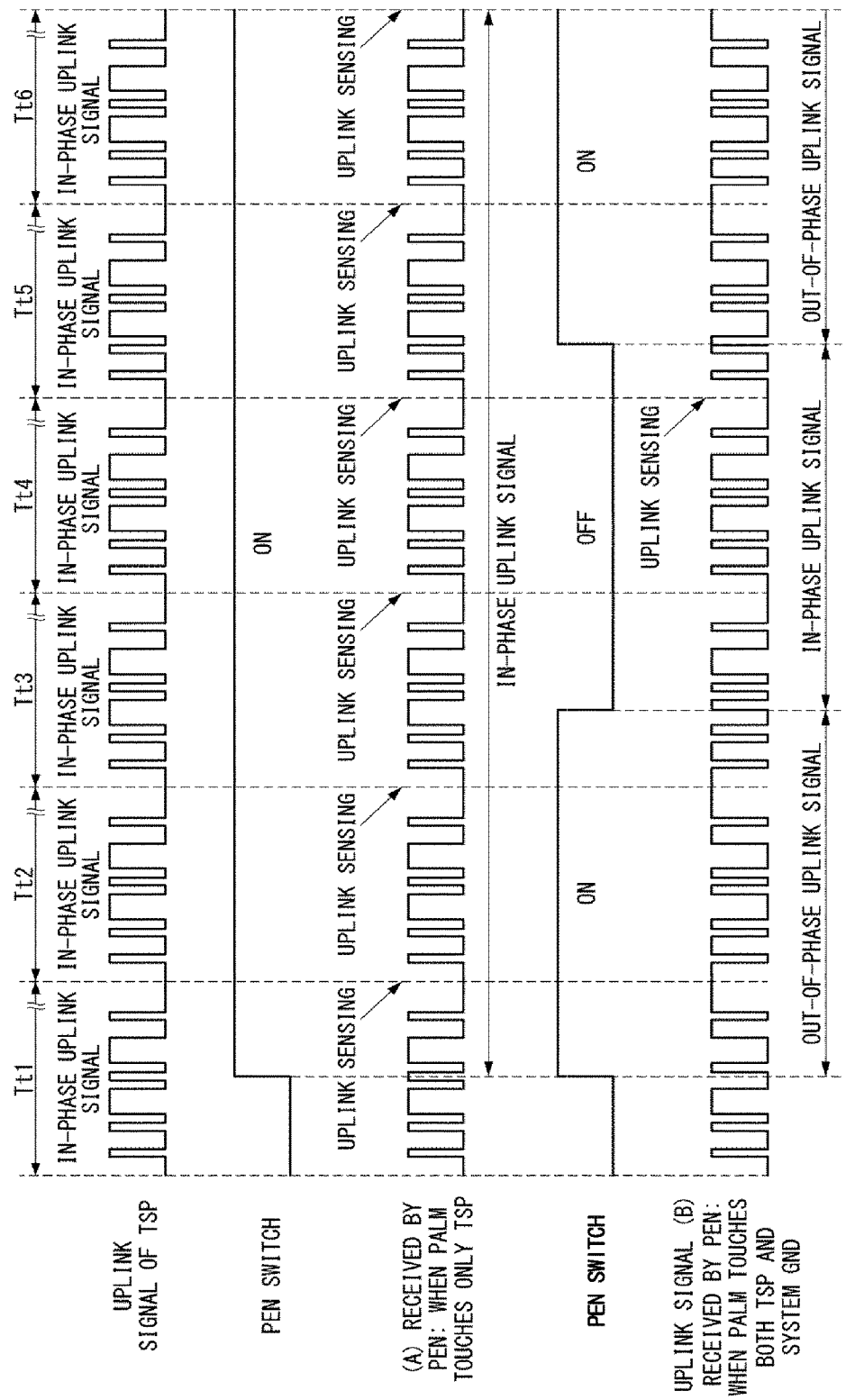
FIG. 21 is a view illustrating a driving scheme allowing an active stylus pen to easily recognize an out-of-phase uplink signal when the uplink signal is received by the pen.
Figure 22:
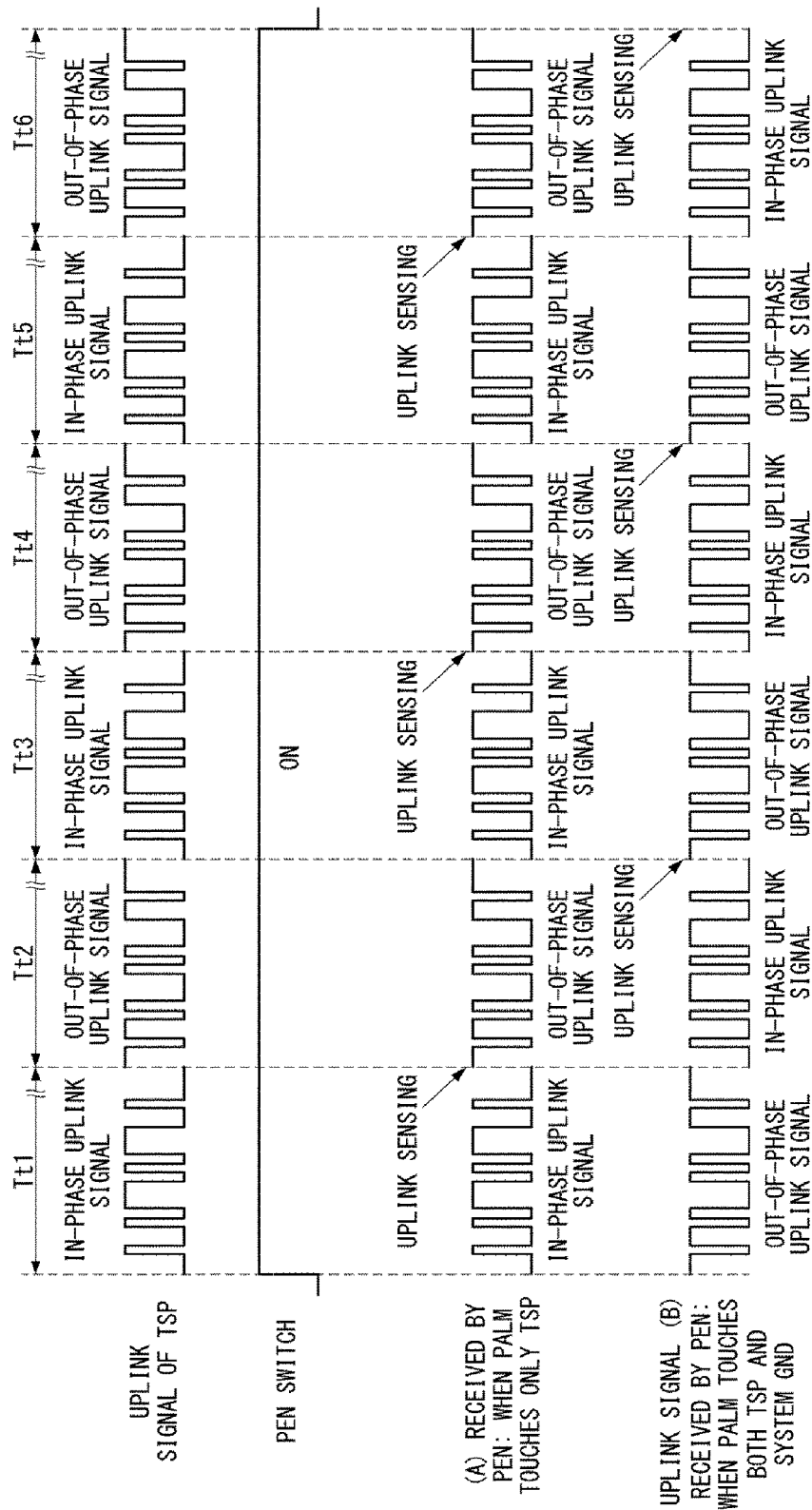
FIG. 22 is a view illustrating another driving scheme allowing an active stylus pen to easily recognize an out-of-phase uplink signal when the uplink signal is received by the pen.

FIGS. 21 and 22 are views illustrating a driving scheme allowing an active stylus pen to easily recognize an out-of-phase uplink signal when the uplink signal is received by the pen.

Referring to FIG. 21, at least one touch period Tt1 to Tt6 of 1 frame is allocated to drive the touch screen TSP, and when an uplink signal is continuously applied in in-phase to the touch screen TSP during the touch periods Tt1 to Tt6, the active stylus pen 20 of the present disclosure controls a switching operation of the switch 300 to interrupt reception of an out-of-phase uplink signal. To this end, the switch 300 is switched on during a reception section for inputting an uplink signal in the touch periods Tt1 to Tt6, and here, when the uplink signal is input in in-phase to the pen driving circuit 200 within the reception section, the switch 300 may be maintained in the ON state, and when the uplink signal is input in out-of-phase to the pen driving circuit 200 within the reception section, the switch 300 may be switched off. As illustrated in FIG. 21, when the palm touches only the touch screen TSP, the in-phase uplink signal is received by the pen 20, and thus, the switch 300 may be continuously switched on. However, when the palm touches the external case (connected to a ground) of the touch sensing system, as well as the touch screen TSP, an out-of-phase uplink signal may be applied to the conductor layer 290. In this case, when the switch 300 is turned off, the out-of-phase uplink signal input to the pen driving circuit 200 may be interrupted and the pen driving circuit 200 may receive only the in-phase uplink signal input through the conductive tip 210 so as to be driven in synchronization. Here, in order to enhance stability of operation, the ON/OFF period of the switch 300 may be longer than a driving period of the uplink signal in the touch screen TSP.

Referring to FIG. 22, the switch 300 of the pen 20 may be maintained in an ON state constantly during the reception section and apply the uplink signal alternately in in-phase and out-of-phase to the touch screen TSP. In other words, when at least one touch periods Tt1 to Tt6 of 1 frame is allocated to drive the touch screen TSP, in the present disclosure, the uplink signal is alternately applied in in-phase and out-of-phase to the touch screen TSP during the touch periods Tt1 to Tt6, and the switch 300 of the pen 20 may be maintained in an ON state during the reception section for inputting the uplink signal. When the palm touches only the touch screen TSP, the uplink signal of the touch screen TSP is received in in-phase by the pen 20. That is, the in-phase uplink signal of the touch screen TSP is received in in-phase by the pen 20, and the out-of-phase uplink signal of the touch screen TSP is received in out-of-phase by the pen 20. Meanwhile, when the palm touches the external case (system ground) of the touch sensing system, as well as the touch screen TSP, the uplink signal of the touch screen TSP is received in the opposite phase by the pen 20. That is, the in-phase uplink signal of the touch screen TSP is received in out-of-phase by the pen 20, and the out-of-phase uplink signal of the touch screen TSP is received in in-phase by the pen 20.

Here, since the switch 300 of the pen 20 is maintained in the ON state, the pen driving circuit 200 may receive only the in-phase uplink signal input through the conductive tip 210 or the conductor layer 290 so as to be driven in synchronization, regardless of whether the palm touches the system ground.

As described above, in the present disclosure, since the conductor layer is added to the outer surface of the housing of the active stylus pen and an electrical connection between the conductor layer and the pen driving circuit is turned on and off through the switch, the active stylus pen is insensitive to external noise and detection performance regarding an uplink signal input from the touch screen may be enhanced regardless of whether the palm touches the touch screen.

In addition, in the present disclosure, since the switch is turned off when an out-of-phase uplink signal is input to the active stylus pen and turned on only when an in-phase uplink signal is input, detection performance regarding an uplink signal input from the touch screen may further be enhanced regardless of whether the palm touches the system ground.

Furthermore, in the present disclosure, since the in-phase uplink signal and the out-of-phase uplink signal are alternately applied to the touch screen and only the in-phase uplink signal is received to perform synchronization driving, detection performance regarding an uplink signal input from the touch screen may further be enhanced regardless of whether the palm touches the system ground.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An active stylus pen, comprising:
a housing coupled to an electrical ground, the housing having an outer surface;
a conductive tip protruding outwardly beyond an end of the housing, the conductive tip being operable to contact a touch screen;
a first insulation layer at least partially surrounding the outer surface of housing;
a conductor layer at least partially surrounding the first insulation layer;
a second insulation layer at least partially surrounding the conductor layer, the second insulation layer providing an outer surface of the active stylus pen;
a pen driving circuit configured to receive an uplink signal and a touch sensor driving signal from the touch screen, to generate a pen driving signal synchronized with the touch sensor driving signal and to output the generated pen driving signal to the touch screen through the conductive tip, the pen driving circuit being housed within the housing; and
a switch configured to selectively couple the conductor layer to the pen driving circuit.

2. The active stylus pen of claim 1, wherein
at least one touch period of one frame is allocated to drive the touch screen, and
the switch is switched on during a reception section of the touch period for inputting the uplink signal, to couple the conductor layer to the pen driving circuit, and
the switch is switched off during a transmission section of the touch period for outputting the pen driving signal, to decouple the conductor layer and the pen driving circuit.

3. The active stylus pen of claim 2, wherein the conductive tip is operably coupled to the touch screen through a pen capacitance, and the conductor layer is operably coupled to the touch screen through a human capacitance.

4. The active stylus pen of claim 3, wherein, during the reception section, the pen driving circuit receives the uplink signal through at least one of the conductive tip and the conductor layer.

5. The active stylus pen of claim 1, wherein
when at least one touch period of one frame is allocated to drive the touch screen and the uplink signal is continuously applied in in-phase to the touch screen during the touch period,
the switch is switched on during a reception section of the touch period for inputting the uplink signal, and when the uplink signal is input in out-of-phase to the pen driving circuit within the reception section, the switch is switched off.

6. The active stylus pen of claim 1, wherein
when at least one touch period of one frame is allocated to drive the touch screen and the uplink signal is alternately applied in in-phase and out-of-phase to the touch screen during the touch period,
the switch is maintained in an ON state during a reception section of the touch period for inputting the uplink signal.

7. The active stylus pen of claim 1, further comprising:
a third insulation layer between the conductive tip and the housing.

8. A touch sensing system, comprising:
a touch screen;
a touch driving device configured to apply an uplink signal and a touch sensor driving signal to the touch screen; and
an active stylus pen configured to generate a pen driving signal synchronized with the touch sensor driving signal and to output the generated pen driving signal to the touch screen,
wherein the active stylus pen includes:
a housing connected to an electrical ground;
a conductive tip protruding outwardly beyond the housing, the conductive tip being operable to contact the touch screen;
a conductor layer at least partially surrounding an outer surface of the housing with a first electrical insulator layer interposed therebetween;
a pen driving circuit configured to receive the uplink signal and the touch sensor driving signal from the touch screen, and to output the pen driving signal to the touch screen through the conductive tip, the pen driving circuit being housed within the housing; and
a switch configured to electrically couple the conductor layer to the pen driving circuit during a reception section of a touch period, and to electrically decouple the conductor layer from the pen driving circuit during a transmission section of the touch period.

9. The touch sensing system of claim 8, wherein
the switch is switched on during the reception section of the touch period and the pen driving circuit receives the uplink signal, and
the switch is switched off during the transmission section of the touch period and the pen driving circuit outputs the pen driving signal.

10. The touch sensing system of claim 9, wherein the conductive tip is operably coupled to the touch screen through a pen capacitance, and the conductor layer is operably coupled to the touch screen through a human capacitance.

11. The touch sensing system of claim 10, wherein, during the reception section, the pen driving circuit receives the uplink signal through at least one of the conductive tip and the conductor layer.

12. The touch sensing system of claim 8, wherein
the uplink signal is continuously applied in in-phase to the touch screen during the touch period, and
the switch is switched off in response to the uplink signal being input in out-of-phase to the pen driving circuit within the reception section.

13. The touch sensing system of claim 8, wherein
the uplink signal is alternately applied in in-phase and out-of-phase to the touch screen during the touch period, and
the switch is maintained in an ON state during the reception section of the touch period for inputting the uplink signal.

14. The touch sensing system of claim 8, wherein the active stylus pen further includes a second electrical insulator layer at least partially surrounding the conductor layer, and a third electrical insulator layer between the conductive tip and the housing.

15. A method, comprising:
applying an uplink signal and a touch sensor driving signal to a touch screen during a touch period;
contacting the touch screen by a conductive tip of an active stylus pen;
receiving, by a pen driving circuit housed within a housing of the active stylus pen, the uplink signal and the touch sensor driving signal during a reception section of the touch period;
generating, by the pen driving circuit, a pen driving signal synchronized with the touch sensor driving signal;
outputting the generated pen driving signal to the touch screen during a transmission section of the touch period; and
controlling a switch to electrically couple a conductor layer that at least partially surrounds the housing of the active stylus pen to the pen driving circuit during the reception section of the touch period, and to electrically decouple the conductor layer from the pen driving circuit during the transmission section of the touch period.

16. The method of claim 15, further comprising:
coupling the capacitive tip to the touch screen through a pen capacitance; and
coupling the conductor layer to the touch screen through a human capacitance.

17. The method of claim 16, wherein, during the reception section, the pen driving circuit receives the uplink signal through at least one of the conductive tip and the conductor layer.

18. The method of claim 17, wherein, during the reception section, the pen driving circuit receives the uplink signal through both of the conductive tip and the conductor layer.

19. The method of claim 15, wherein applying the uplink signal includes continuously applying the uplink signal in-phase during the touch period, the method further comprising:
electrically decoupling the conductor layer from the pen driving circuit in response to the uplink signal being received by the pen driving circuit in out-of-phase during the reception section of the touch period.

20. The method of claim 15, wherein applying the uplink signal includes alternately applying the uplink signal in-phase and out-of-phase to the touch screen during the touch screen period, the method further comprising:
electrically decoupling the conductor layer from the pen driving circuit in response to the uplink signal being received by the pen driving circuit in out-of-phase during the reception section of the touch period.

* * * * *